(12) United States Patent
Benjamin et al.

(10) Patent No.: US 11,880,230 B2
(45) Date of Patent: *Jan. 23, 2024

(54) TECHNIQUES FOR AUTOMATICALLY GENERATING DESIGNS HAVING CHARACTERISTIC TOPOLOGIES FOR URBAN DESIGN PROJECTS

(71) Applicant: AUTODESK, INC., San Francisco, CA (US)

(72) Inventors: David Benjamin, Brooklyn, NY (US); James Stoddart, Atlanta, GA (US); Lorenzo Villaggi, Brooklyn, NY (US); Danil Nagy, New York, NY (US)

(73) Assignee: AUTODESK, INC., San Francisco, CA (US)

( * ) Notice: Subject to any disclaimer, the term of this patent is extended or adjusted under 35 U.S.C. 154(b) by 142 days.

This patent is subject to a terminal disclaimer.

(21) Appl. No.: 17/343,566

(22) Filed: Jun. 9, 2021

(65) Prior Publication Data

US 2021/0294935 A1 Sep. 23, 2021

Related U.S. Application Data

(63) Continuation of application No. 16/184,974, filed on Nov. 8, 2018, now Pat. No. 11,157,662.

(Continued)

(51) Int. Cl.
*G06F 30/13* (2020.01)
*G06N 3/126* (2023.01)
(Continued)

(52) U.S. Cl.
CPC ............ *G06F 30/13* (2020.01); *G06N 3/126* (2013.01); *G06Q 10/06313* (2013.01);
(Continued)

(58) Field of Classification Search
CPC .. G06F 30/13; G06F 3/04815; G06F 3/04847; G06F 2111/02; G06F 2111/04;
(Continued)

(56) References Cited

U.S. PATENT DOCUMENTS 7,164,883 B2 1/2007 Rappaport et al.
9,697,326 B1 7/2017 Bowman et al.
(Continued)

FOREIGN PATENT DOCUMENTS

| CN | 1381660 A | 11/2002 |
| CN | 2895621 Y | 5/2007 |

(Continued)

OTHER PUBLICATIONS

Final Office Action received for U.S. Appl. No. 16/184,972 dated Jan. 13, 2023, 29 pages.

(Continued)

*Primary Examiner* — Kandasamy Thangavelu
(74) *Attorney, Agent, or Firm* — Artegis Law Group, LLP

(57) ABSTRACT

An urban design pipeline automatically generates design options for an urban design project. The urban design pipeline includes a geometry engine and an evaluation engine. The geometry engine analyzes design criteria, design objectives, and design heuristics associated with the urban design project and then generates numerous candidate designs. The design criteria specify a property boundary associated with a region of land to be developed. The design objectives indicate a specific type of topology that is derived from an existing urban layout. The design heuristics include different sets of construction rules for generating designs with specific types of topologies. The geometry engine generates candidate designs that conform to the property boundary and have topological characteristics in common with the existing urban layout.

22 Claims, 24 Drawing Sheets

Related U.S. Application Data

(60) Provisional application No. 62/584,711, filed on Nov. 10, 2017.

(51) Int. Cl.

| | |
|---|---|
| *G06Q 40/12* | (2023.01) |
| *G06Q 10/0631* | (2023.01) |
| *G06Q 50/16* | (2012.01) |
| *G06F 111/02* | (2020.01) |
| *G06F 111/04* | (2020.01) |
| *G06F 111/06* | (2020.01) |
| *G06F 111/20* | (2020.01) |
| *G06F 3/04815* | (2022.01) |
| *G06F 3/04847* | (2022.01) |

(52) U.S. Cl.
CPC ........... *G06Q 40/12* (2013.12); *G06Q 50/165* (2013.01); *G06F 3/04815* (2013.01); *G06F 3/04847* (2013.01); *G06F 2111/02* (2020.01); *G06F 2111/04* (2020.01); *G06F 2111/06* (2020.01); *G06F 2111/20* (2020.01)

(58) Field of Classification Search
CPC . G06F 2111/06; G06F 2111/20; G06N 3/126; G06Q 10/06313; G06Q 40/12; G06Q 50/165
See application file for complete search history.

(56) References Cited

U.S. PATENT DOCUMENTS

| | | |
|---|---|---|
| 10,074,145 B2 | 9/2018 | Budlong |
| 10,255,383 B2 | 4/2019 | Gavini et al. |
| 10,452,790 B2 | 10/2019 | Kim et al. |
| 10,747,913 B2 | 8/2020 | Iorio |
| 10,885,236 B2 | 1/2021 | Cheong et al. |
| 11,144,681 B2 | 10/2021 | Benjamin et al. |
| 11,275,872 B2 | 3/2022 | Benjamin et al. |
| 11,574,093 B2 | 2/2023 | Hoyer et al. |
| 11,593,533 B2 | 2/2023 | Grossman et al. |
| 2005/0108982 A1 | 5/2005 | Formisano |
| 2010/0106674 A1* | 4/2010 | McLean ................... F24F 11/46 706/52 |
| 2010/0217565 A1 | 8/2010 | Wayne et al. |
| 2012/0173209 A1 | 7/2012 | Krebs et al. |
| 2012/0271784 A1 | 10/2012 | McLean et al. |
| 2013/0132440 A1 | 5/2013 | Carlson et al. |
| 2014/0107851 A1 | 4/2014 | Yoon et al. |
| 2014/0278280 A1 | 9/2014 | Pardo-Fernandez |
| 2019/0147116 A1 | 5/2019 | Benjamin et al. |
| 2019/0147117 A1 | 5/2019 | Benjamin et al. |
| 2019/0147118 A1 | 5/2019 | Benjamin et al. |
| 2019/0147119 A1 | 5/2019 | Benjamin et al. |
| 2019/0147120 A1 | 5/2019 | Benjamin et al. |
| 2019/0325086 A1 | 10/2019 | Grossman et al. |
| 2019/0347080 A1 | 11/2019 | Benjamin et al. |
| 2020/0013127 A1 | 1/2020 | Gozes et al. |
| 2020/0210533 A1 | 7/2020 | Markiz |
| 2021/0150083 A1 | 5/2021 | Benjamin et al. |
| 2021/0150084 A1 | 5/2021 | Benjamin et al. |
| 2021/0150085 A1 | 5/2021 | Benjamin et al. |
| 2021/0241864 A1 | 8/2021 | Bhattacharya et al. |
| 2022/0198087 A1 | 6/2022 | Benjamin et al. |

FOREIGN PATENT DOCUMENTS

| | | | |
|---|---|---|---|
| CN | 100452071 C | 1/2009 | |
| CN | 101782399 A | 7/2010 | |
| CN | 101545321 B | 12/2010 | |
| CN | 102368309 A * | 3/2012 | |
| CN | 102663800 A | 9/2012 | |
| CN | 102750411 A | 10/2012 | |
| CN | 103020741 A | 4/2013 | |
| CN | 102521443 B | 5/2013 | |
| CN | 104631243 A | 5/2015 | |
| CN | 105205283 A | 12/2015 | |
| CN | 105761192 A * | 7/2016 | ............. G06Q 50/26 |
| CN | 105825003 A | 8/2016 | |
| CN | 105894553 A | 8/2016 | |
| CN | 106251020 A * | 12/2016 | ........... G06Q 50/165 |
| CN | 106446000 A | 2/2017 | |
| CN | 106599332 A * | 4/2017 | |
| CN | 106909986 A | 6/2017 | |
| CN | 106952330 A | 7/2017 | |
| CN | 107016221 A | 8/2017 | |
| CN | 107133900 A | 9/2017 | |
| JP | 2012-518838 A | 8/2012 | |
| KR | 20110054221 A | 5/2011 | |
| WO | 00/00919 A1 | 1/2000 | |
| WO | 00/57004 A1 | 9/2000 | |
| WO | 2006/088550 A2 | 8/2006 | |
| WO | 2007/073641 A1 | 7/2007 | |
| WO | 2011/035542 A1 | 3/2011 | |
| WO | 2013/161824 A1 | 10/2013 | |

OTHER PUBLICATIONS

Final Office Action received for U.S. Appl. No. 16/184,972 dated Dec. 2, 2021, 31 pages.
Wikipedia, ModeFrontier, https"en.wikipeida.org/wiki/ModeFRONTIER, 1 page.
Beirao, Jose Nuno, "Architecture and the Built Environment", 2012, CityMaker Designing Grammars for Urban Design, 276 pages.
"Simulation Process Integration and Automation", Automate, integrate and drive mulitple CAD/CAE tools, 5 pages.
Notice of Allowance received for U.S. Appl. No. 16/184,974 dated Mar. 15, 2021, 24 pages.
Non Final Office action received for U.S. Appl. No. 16/184,975, dated Mar. 24, 2021, 52 pages.
Notice of Allowance received for U.S. Appl. No. 16/181,224 dated Mar. 3, 2021, 17 pages.
Notice of Allowance received for U.S. Appl. No. 16/184,974 dated Jun. 17, 2021, 21 pages.
Notice of Allowance received for U.S. Appl. No. 16/181,224 dated Jun. 9, 2021, 17 pages.
Notice of Allowance received for U.S. Appl. No. 16/184,975, dated Jul. 16, 2021, 17 pages.
Notice of Allowance received for U.S. Appl. No. 16/182,557, dated Oct. 26, 2021, 28 pages.
Non Final Office Action received for U.S. Appl. No. 16/184,972 dated Jun. 9, 2022, 35 pages.
Shi et al., "A review of Simulation-Based Urban form Generation and Optimization for Energy-Driven Urban Design", Building and Environment, vol. 121, May 9, 2017, pp. 119-129.
Yusuf, Syed Adnan, "An Evolutionary AI-Based Decision Support System for Urban Regeneration Planning", URL: https://core.ac.uk/download/pdf/40034719.pdf, Chapters 5-7, Mar. 1, 2010, pp. 155-235.
Aliaga et al., "Interactive Example-Based Urban Layout Synthesis", ACM Transactions on Graphics (TOG), ACM, vol. 27, No. 5, Article 160, Dec. 1, 2008, pp. 1-10.
Anonymous: "Grid plan—Wikipedia", URL:https://en.wikipedia.org/w/index.php?title=Grid plan&oldid=808141305, Nov. 1, 2017, pp. 1-19.
Wang et al., "Restructuring surface tessellation with irregular boundary conditions", Frontiers of Architectural Research, vol. 3, No. 4, Dec. 1, 2014, pp. 337-347.
Vanegas et al., "Visualization of Simulated Urban Spaces: Inferring Parameterized Generation of Streets, Parcels, and Aerial Imagery", IEEE, May 2009, pp. 424-435.
Hartmann et al., "Content-Aware Re-targeting of Discrete Element Layouts", WSCG 2015 Conference on Computer Graphics, Visualization and Computer Vision, 2015, pp. 173-182.
Sosa et al., "Urban grid forms as a strategy for reducing heat island effects in arid cities", Sustainable Cities and Society, Jul. 2017, pp. 547-556.

(56) References Cited

OTHER PUBLICATIONS

Lezama et al., "Vanishing Point Detection in Urban Scenes Using Point Alignments", Image Processing On Line, vol. 7, 2017, pp. 131-164.
Shen et al., "Urban function connectivity: Characterisation of functional urban streets with social media check-in data", Jun. 2016, pp. 9-21.
Oshima et al., "Geometry reconstruction and mesh generation techniques for acoustic simulations over real-life urban areas using digital geographic information", Acoust. Sci. & Tech., vol. 35, No. 2, 2014, pp. 108-118.
Martins et al., "From solar constraints to urban design opportunities: Optimization of built form typologies in a Brazilian tropical city", vol. 76, 2014, pp. 43-56.
Parish et al., "Procedural Modeling of Cities", ACM SIGGRAPH 2001, pp. 301-308.
Ferriera et al., "Urbane: A 3D Framework to Support Data Driven Decision Making in Urban Development", IEEE Conference on Visual Analytics Science and Technology, Oct. 25-30, 2015, pp. 97-104.
Gracik et al., "Effect of urban neighborhoods on the performance of building cooling Systems", Building and Environment, Mar. 2015, pp. 15-29.
Chang et al., "Legible Simplification of Textured Urban Models", IEEE Computer Graphics and Applications, 2008, pp. 27-36.
Schneider, Sven, "Automatisierte Erzeugung raumlicher Konfigurationen in Architekturund Stadtebau auf Basis sichtbarkeitsbasierter Raumreprasentationen Dissertation", May 31, 2016, pp. 105-169.
Urquizo et al., "Metrics of urban morphology and their impact on energy consumption: A case study in the United Kingdom", Energy Research & Social Science, vol. 32, 2017, pp. 193-206.
Marler et al., "The weighted sum method for multi-objective optimization: new insights", Struct Multidisc Optim, DOI 10.1007/s00158-009-0460-7, vol. 41, 2010, pp. 853-862.
ArcGIS—Wikipedia, the free encyclopedia, retrieved from https://en.wikipedia.org/wiki/ArcGIS, 2016, 9 pages.
Non-Final Office Action received for U.S. Appl. No. 16/184,972, dated May 27, 2021, 37 pages.
Martins et al., From solar constraints to urban design opportunities: Optimization of built form typologies in a Brazilian tropical city, pp. 43-56.
ArcGIS, Wikipedia, the free encyclopedia, https://en.wikipedia.org/wiki/ArcGIS, 2016, 9 pages.
Urquizo et al.n "Metrics of urban morphology and their impact on energy consumption: A case study in the United Kingdom", 25 pages.
Marler et al., The weighted sum method for multi-objective optimiziation: new insights:, DOI 1031007/s00158-009-0460-7, 21 pages.
Non Final Office Action received for U.S. Appl. No. 17/342,309 dated May 1, 2023, 44 pages.
Non Final Office Action received for U.S. Appl. No. 17/531,622 dated May 19, 2023, 44 pages.
Non Final Office Action received for U.S. Appl. No. 17/342,309 dated Aug. 25, 2023, 12 pages.
Final Office Action received for U.S. Appl. No. 17/531,622 dated Aug. 28, 2023, 14 pages.
Notice of Allowance received for U.S. Appl. No. 16/184,972 dated Aug. 29, 2023, 21 pages.
Notice of Allowance received for U.S. Appl. No. 16/184,972 dated Dec. 1, 2023, 21 pages.
First Office Action received for U.S. Appl. No. 17/342,309 dated Dec. 13, 2023, 17 pages.

* cited by examiner

TECHNIQUES FOR AUTOMATICALLY GENERATING DESIGNS HAVING CHARACTERISTIC TOPOLOGIES FOR URBAN DESIGN PROJECTS

CROSS-REFERENCE TO RELATED APPLICATIONS

This application is a continuation of the co-pending U.S. patent application titled, "TECHNIQUES FOR AUTOMATICALLY GENERATING DESIGNS HAVING CHARACTERISTIC TOPOLOGIES FOR URBAN DESIGN PROJECTS," filed on Nov. 8, 2018 and having Ser. No. 16/184,974, which claims the priority benefit of U.S. provisional patent application titled, "GENERATIVE DESIGN TECHNIQUES FOR URBAN AND NEIGHBORHOOD PLANNING," filed on Nov. 10, 2017 and having Ser. No. 62/584,711. The subject matter of these related applications is hereby incorporated herein by reference.

BACKGROUND

Field of the Various Embodiments

Embodiments of the present invention relate generally to computer-aided design technology and, more specifically, to techniques for automatically generating designs having characteristic topologies for urban design projects.

Description of the Related Art

In a typical urban design project, a designer generates a design for developing a property. For example, the designer could plan the placement and organization of a number of houses to be built within a housing subdivision. The designer usually generates each design by manually and/or mentally making a number of design choices based on various design criteria and design objectives associated with the urban design project.

One common design criterion in urban design projects is that construction can occur only within the boundaries of the property being developed. Accordingly, when making various design choices, the designer has to manually and/or mentally adapt the organization of his/her design with the relevant property boundaries. For example, the designer could place a road perpendicular to a given property boundary to produce an entrance/egress point for the associated property. One common design objective in urban design projects is that a given design should have characteristics that are derived from a pre-existing urban layout, which could include specific features or general organizational principles. To address this design objective, a designer usually has to study the pre-existing urban layout and then use intuition and creativity to generate a design that incorporates one or more characteristics of the pre-existing urban layout. For example, the designer could observe that the pre-existing urban layout includes three access points and then generate one or more designs that also include three access points. As a second example, the designer could observe that the pre-existing layout includes a radial pattern of streets and circulation and then generate one or more designs that also include a radial pattern of streets and circulation.

One drawback of the above approach is that designers cannot always generate designs that both fit within the relevant property boundaries and include characteristics derived from a pre-existing urban layout. In particular, property boundaries oftentimes have complicated and awkward shapes that pose difficulties for designers when working on designs. Additionally, these property boundaries can differ significantly from the property boundaries associated with pre-existing urban layouts, which prevents designers from reusing those pre-existing urban layouts. Conversely, pre-existing urban layouts sometimes have complex and elaborate topologies that cannot easily be adapted to the boundaries of a property for which a designer is developing a design. Consequently, designers oftentimes generate designs that either do not fit within the boundaries of the properties for which the designs are being developed or do not include characteristics derived from any pre-existing urban layout. Therefore, in practice, a designer usually has to modify a design over many iterations until a feasible design is generated.

Another drawback of the above approach is that the process of making design choices for a given urban design project based on a specific property boundaries and a specific pre-existing urban layout usually cannot be readily applied to other subsequent urban design projects. In particular, subsequent urban design projects typically have different property boundaries or need to be reflective of different pre-existing urban layouts. Consequently, the iterative design process followed by designers and described above usually has to be developed from scratch for each new urban design project.

As the foregoing illustrates, what is needed in the art are more effective techniques for generating designs for urban design projects.

SUMMARY

Various embodiments include a computer-implemented method for generating designs for an urban design project via a computer-aided design (CAD) application, including generating, via a geometry engine included in the CAD application, a design mesh for a plurality of candidate designs based on a first design criterion associated with a region of land, populating, via the geometry engine, the design mesh with a first set of structures based on a first set of construction rules and a first set of construction parameters to generate a first candidate design, wherein the first set of structures is organized within the first candidate design according to a first topology that is derived from a pre-existing topology associated with a pre-existing urban layout, generating, via an evaluation engine included in the CAD application, a first topological metric for the first candidate design based on the first topology, wherein the first topological metric indicates a first number of characteristic features included in the first candidate design that are also included in the pre-existing urban layout, populating, via the geometry engine, the design mesh with a second set of structures based on the first set of construction rules and a second set of construction parameters to generate a second candidate design, wherein the second set of structures is organized within the second candidate design according to a second topology that is derived from the pre-existing topology, generating, via the evaluation engine, a second topological metric for the second candidate design based on the second topology, wherein the second topological metric indicates a second number of characteristic features included in the second candidate design that are also included in the pre-existing urban layout, and determining, via the evaluation engine, that the second topological metric exceeds the first topological metric, thereby indicating that the second candidate design is a higher ranked design than the first candidate design.

At least one technological advantage of the disclosed urban design pipeline is that design options are automatically generated that both respect a current property boundary and also include characteristic features derived from the topology of an existing urban layout. Accordingly, designers can generate design options based on complex property boundaries that include similar attributes as existing urban layouts.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

Figure 1:
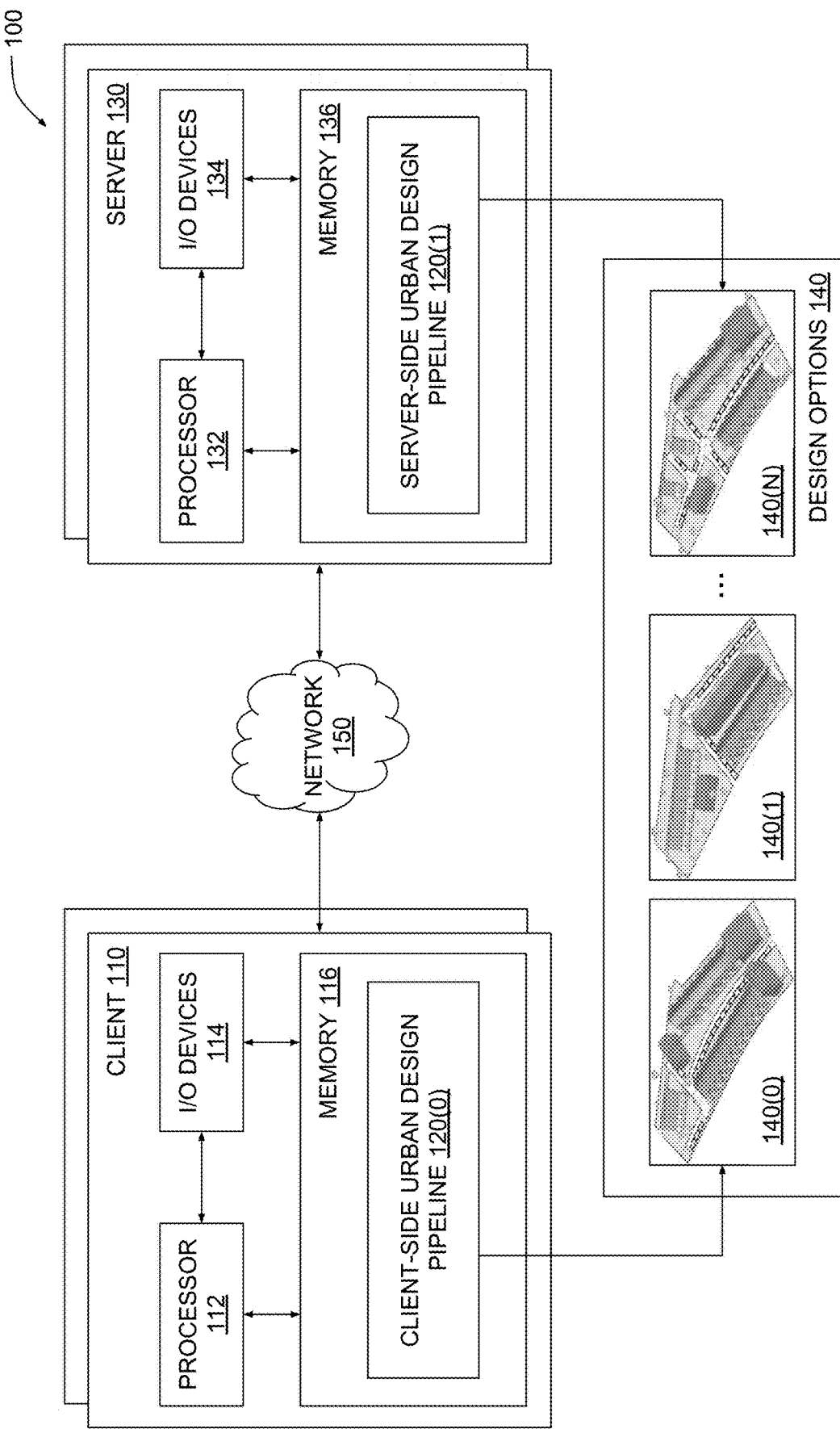
FIG. 1 illustrates a system configured to implement one or more aspects of the present invention.

In the following description, numerous specific details are set forth to provide a more thorough understanding of the various embodiments. However, it will be apparent to one skilled in the art that the inventive concepts may be practiced without one or more of these specific details.

As noted above, designers typically rely on intuition and experience to generate designs that both respect a given property boundary and also appear topologically similar to existing urban layouts. However, doing so can be difficult because property boundaries oftentimes have complex and awkward shapes that differ significantly from the property boundaries associated with existing layouts. Likewise, existing urban layouts can have complex topologies that are not easily adaptable to different property boundaries. Consequently, designers oftentimes generate designs that either do not fit within the property boundary or do not appear to be inspired by the existing urban layout. In practice, designers usually have to iteratively modify designs many times until a feasible design is generated. Furthermore, this iterative process cannot be applied to other urban design projects. Consequently, designers usually have to start from scratch with each new urban design project.

To address these issues, embodiments of the invention include an urban design pipeline that automatically generates design options for an urban design project. The urban design pipeline includes a geometry engine and an evaluation engine. The geometry engine analyzes design criteria, design objectives, and design heuristics associated with the urban design project and then generates numerous candidate designs. The design criteria specify a property boundary associated with a region of land to be developed, among other things. The design objectives indicate specific objective functions that should be optimized as well as various attributes that designs should have, including a specific type of topology that is derived from an existing urban layout. The design heuristics include different sets of construction rules for generating designs with different types of topologies. The geometry engine generates candidate designs that conform to the property boundary and have topological characteristics in common with the existing urban layout. Each candidate design includes a different layout of roads, house units, apartment units, and parkland suitable for populating the region of land with occupants.

The evaluation engine evaluates each candidate design across a set of designs metrics in order to inform further iteration of the geometry engine. Based on these design metrics, the geometry engine modifies the candidate designs to generate additional designs that more effectively optimize the design metrics. The geometry engine and evaluation engine operate iteratively in this manner until a convergence criterion is met and a final set of design options is generated. These design options have topologies that not only conform to the property boundary but also include similar topological features as an existing urban layout.

At least one technological advantage of the disclosed urban design pipeline is that design options are automatically generated that both respect a current property boundary and also include characteristic features derived from the topology of an existing urban layout. Accordingly, designers can generate design options based on complex property boundaries with features that are similar to existing urban layouts. Another technological advantage is that the disclosed urban design pipeline includes repeatable components that can be easily adapted to other urban design projects with different property boundaries that need to be inspired by different existing urban layouts. Thus, the process of generating designs can be greatly expedited compared to conventional, manual techniques. These technological advantages represent multiple technological advancements relative to prior art approaches.

System Overview

FIG. 1 illustrates a system configured to implement one or more aspects of the present invention. As shown, a system 100 includes one or more clients 110 and one or more servers 130 configured to interoperate to generate a set of design options 140 for an urban design project. A given client 110 or a given server 130 may be any technically feasible type of computer system, including a desktop computer, a laptop computer, a mobile device, a virtualized instance of a computing device, a distributed and/or cloud-based computer system, and so forth. Clients 110 and servers 130 are coupled together via a network 150. Network 150 may be any technically feasible set of interconnected communication links, including a local area network (LAN), wide area network (WAN), the World Wide Web, or the Internet, among others.

As further shown, a client 110 includes a processor 112, input/output (I/O) devices 114, and a memory 116, coupled together. Processor 112 includes any technically feasible set of hardware units configured to process data and execute software applications. For example, processor 112 could include one or more central processing units (CPUs). I/O devices 114 include any technically feasible set of devices configured to perform input and/or output operations, including, for example, a display device, a keyboard, and a touchscreen, among others.

Memory 116 includes any technically feasible storage media configured to store data and software applications, such as, for example, a hard disk, a random-access memory (RAM) module, and a read-only memory (ROM). Memory 116 includes client-side urban design pipeline 120(0). Client-side urban design pipeline 120(0) is a software application that, when executed by processor 112, causes processor 112 to participate in generating design options 140. In doing so, client-side urban design pipeline 120(0) interoperates with a corresponding client-side urban design pipeline 120 (1) that resides within server 130, as described in greater detail below.

Server 130 includes a processor 132, I/O devices 134, and a memory 136, coupled together. Processor 132 includes any technically feasible set of hardware units configured to process data and execute software applications, such as one or more CPUs. I/O devices 134 include any technically feasible set of devices configured to perform input and/or output operations, such as a display device, a keyboard, or a touchscreen, among others.

Memory 136 includes any technically feasible storage media configured to store data and software applications, such as, for example, a hard disk, a RAM module, and a ROM. Memory 136 includes server-side urban design pipeline 120(1). Server-side urban design pipeline 120(1) is a software application that, when executed by processor 132, causes processor 132 to participate in generating design options 140. In so doing, server-side urban design pipeline 120(1) interoperates with client-side urban design pipeline 120(0), as mentioned above.

In operation, one or more instances of client-side urban design pipeline 120(0) and one or more instances of server-side urban design pipeline 120(1) interoperate to generate multiple design options 140(0)-140(N). Each design option 140 describes a different development plan for developing a physical property to have a particular topology. The topology associated with a given design option 140 conforms to a property boundary associated with the physical property and also shares organizational attributes with an existing urban layout. As a general matter, one or more client-side urban design pipelines 120(0) and one or more server-side urban design pipelines 120(1) collectively represent different portions of a distributed software entity. Thus, for simplicity, client-side urban design pipeline 120(0) and server-side urban design pipeline 120(1) will be collectively referred to herein as urban design pipeline 120. Urban design pipeline 120 is described in greater detail below in conjunction with FIG. 2.

Figure 2:
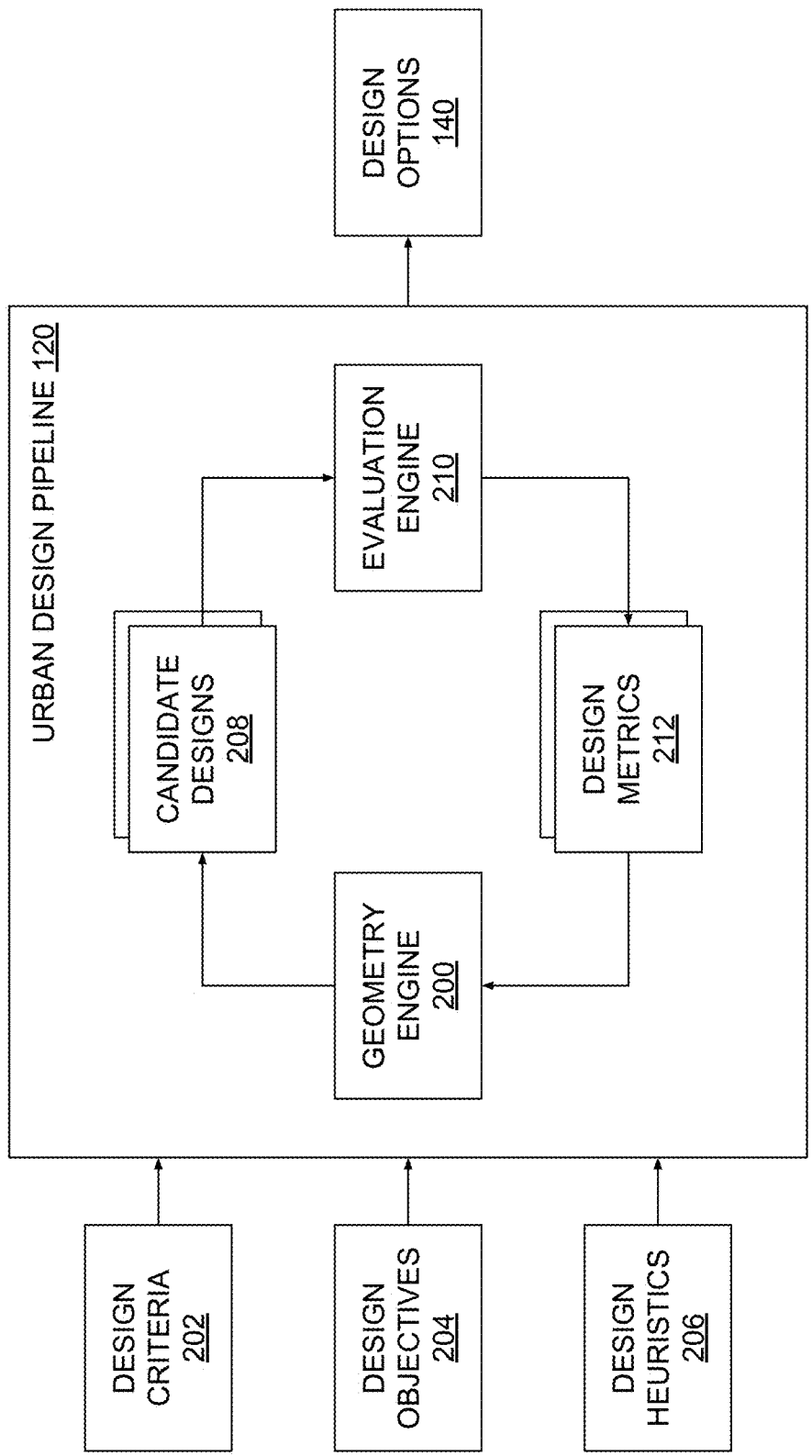
FIG. 2 is a more detailed illustration of the urban design pipeline of FIG. 1, according to various embodiments of the present invention.

FIG. 2 is a more detailed illustration of the urban design pipeline of FIG. 1, according to various embodiments of the present invention. As shown, urban design pipeline 120 includes a geometry engine 200 and an evaluation engine 210. Geometry engine 200 and evaluation engine 210 are configured to perform an iterative process to generate design options 140 based on design criteria 202, design objectives 204, and design heuristics 206.

Design criteria 202 can include design constraints that generally describe features and/or attributes of designs that should be avoided when generating design options 140. A given design constraint could indicate, for example, regions of the physical property where the construction of structures cannot occur, a maximum number of floors for structures that cannot be exceeded, disallowed placement patterns for roads, and so forth. Design constraints can be derived from local development regulations and/or building codes as well as directives received from one or more stakeholders in the urban design project.

Design criteria 202 can also include design requirements that generally describe features and/or attributes of designs that should be included within design options 140. A given design requirement could indicate, for example, one or more required orientations for structures, a number of parking lots needed for each structure, a target configuration for road intersections, and so forth. Design requirements can be derived from local development regulations and/or building codes as well as directives received from one or more stakeholders in the urban design project.

Design criteria 202 includes a property boundary associated with the physical property to be developed. For example, design criteria 202 could include a sequence of vertices that delineate the property boundary. The property boundary can have any technically feasible shape, including simple shapes such as squares and other polygons as well as more complex shapes involving both linear and curved segments. As a general matter, the property boundary is a closed contour that defines a region of land to be developed.

Design objectives 204 include a set of objective functions to be maximized or minimized when generating design options 140. A given objective function quantifies a specific attribute of a given design. In practice, design objectives 204 include objective functions that quantify solar energy collection, available sight lines associated with windows in structures, the size of yards associated with structures, the variety of neighborhoods, the distribution of programs, total project cost, and total project profit.

In addition, design objectives 204 include an indication of at least one type of topology that should be emulated by any given candidate design 208. As referred to herein, the term "topology" refers to at least one of the organization of structures within a given design and a pattern of interconnections between those structures. For example, the topology of a given design could refer to the placement of various houses within the given design and/or the layout of roads that connect those houses.

Design heuristics 206 include different sets of construction rules for generating designs that have different types of topologies. For example, a first set of construction rules could be used to generate designs where many perpendicular roads that define a grid of parcels populated with high-rise apartment complexes. A given set of construction rules can be derived from the topology of an existing urban layout. In the example described above, the first set of construction rules could be derived from the topology of Manhattan, where high-rise apartment complexes populate areas defined by a grid of roads.

In one embodiment, design heuristics 206 include rules associated with the generation of roads. Such rules may include rules that control the length, width, placement, and orientation of segments of roads, as well as rules that control how segments of roads connect to one another. In another embodiment, design heuristics 206 include rules associated with the generation of neighborhoods. Such rules may include rules that control the dimensions, aspect ratios, shapes, and alignments of neighborhoods. In yet another embodiment, design heuristics 206 include rules associated with the placement of dwelling units. These rules may include rules that control the orientation, grouping, and variation of dwelling units, as well as rules that control the geometry of individual dwelling units.

In operation, geometry engine 200 receives design criteria 202, design objectives 204, and design heuristics 206 and generates candidate designs 208 for the urban design project. Each candidate design 208 describes a different development plan for developing the physical property with various structures, roads, and other fixtures associated with the urban design project. A given candidate design 208 meets some or all design criteria 202 and is therefore generally considered a feasible design. Candidate designs 208 also achieve design objectives 204 to varying degrees. Finally, because candidate designs 208 are constructed according to design heuristics 206 in the manner described above, the topologies of those designs have at least some organizational characteristics in common.

In one embodiment, geometry engine 200 may generate each candidate design 208 by parameterizing the set of construction rules included in design heuristics 206 and then selecting a set of parameters. Geometry engine 200 may generate each candidate design 208 based on a different set of parameters in order to produce different candidate designs 208 having similar features.

Evaluation engine 210 evaluates each candidate design 208 based on the objective functions included in design objectives 204 to generate design metrics 212. The design metrics 212 generated for a given candidate design 208 quantify the degree to which design objectives 204 are met by the given candidate design 208. Some design metrics 212 quantify the solar energy collection, available sight lines, yard size, neighborhood variety, program distribution, total project cost, and total project profit for the given candidate design 208.

In one embodiment, a topological metric generated for a given candidate design 208 indicates the degree to which the topology of the candidate design resembles the topology of an existing urban layout. Evaluation engine 210 may compute the topological metric by comparing the topology of the candidate design 208 to the topology of the existing urban layout and then computing a total number of similar features or attributes. For example, if the topology of the existing urban layout includes numerous 5-way intersections, then evaluation engine 210 could count the number of 5-way intersections included in the topology of the candidate design 208. Evaluation engine 210 could then compare that number to the number of 5-way intersections included in the existing urban layout to generate the topological metric.

Geometry engine 200 analyzes design metrics 212 in conjunction with candidate designs 208 and then regenerates and/or modifies candidate designs 208, based on design heuristics 206, to generate improved versions of candidate designs 208 that better achieve design objectives 204 while still meeting design criteria 202. In the manner described, geometry engine 200 and evaluation engine 210 complete an iteration of urban design pipeline 120. In a subsequent iteration, evaluation engine 210 generates design metrics 212 for these improved versions of candidate designs 208, and geometry engine 200 again regenerates and/or modifies candidate designs 208.

Geometry engine 200 and evaluation engine 210 iterate until one or more convergence criteria are met. When the convergence criteria are met, urban design pipeline 120 outputs the final set of candidate designs 208 as design options 140. In one embodiment, geometry engine 200 and evaluation engine 210 execute a multi-objective solver in order to generate and/or update candidate designs 208 until design metrics 212 reach specific threshold values specified in the convergence criteria.

When generating candidate designs 208 as described above, geometry engine 200 implements a multi-step process that is described in greater detail below in conjunction with FIG. 3.

Figure 3:
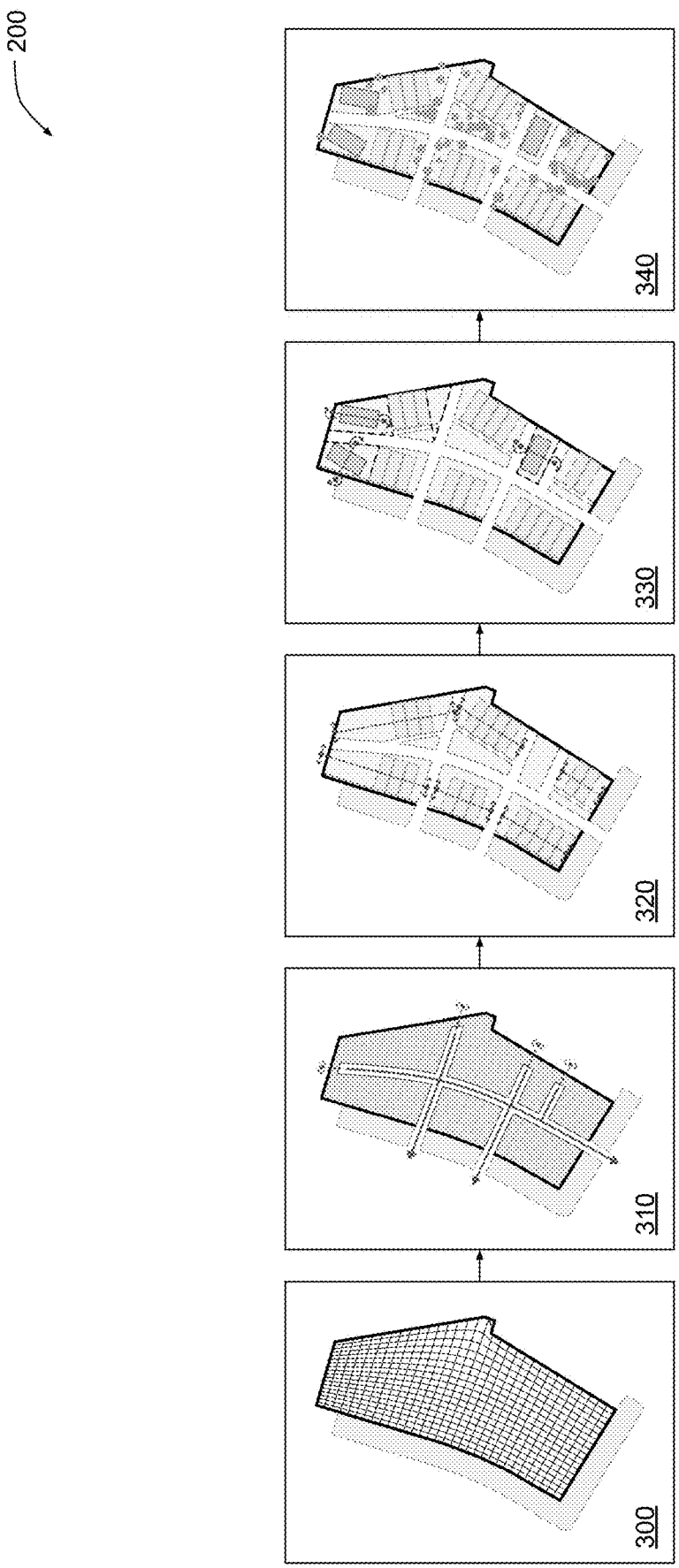
FIG. 3 is a more detailed illustration of the geometry engine of FIG. 2, according to various embodiments of the present invention.

FIG. 3 is a more detailed illustration of the geometry engine of FIG. 2, according to various embodiments of the present invention. As shown, geometry engine 200 includes various modules organized in a sequential arrangement. Those modules include a mesh generation module 300, a neighborhood topology module 310, a house topology module 320, an apartment topology module 330, and a vegetation module 340. Each of the modules shown performs a different set of operations in the generation of candidate designs 208.

Mesh generation module 300 generates an initial mesh for candidate designs 208 based on the property boundary associated with the physical property to be developed. Various operations performed during mesh generation module 300 are described in greater detail below in conjunction with FIGS. 5-12. Neighborhood topology module 310 generates a network of interconnected roads to define a neighborhood topology based on the initial mesh generated during mesh generation module 300 and based on design heuristics 206. Various operations performed during neighborhood topology module 310 are described in greater detail below in conjunction with FIGS. 5 and 13-16. House topology module 320 generates topologies of house units within the neighborhoods generated via neighborhood topology module 310 and based on design heuristics 206. House topology module 320 is described in greater detail below in conjunction with FIGS. 5 and 17-21. Apartment topology module 330 generates topologies of apartment units in unoccupied portions of neighborhoods based on design heuristics 206. Apartment topology module 330 is described along with house topology module 320 below in conjunction with FIGS. 5 and 17-21. Vegetation module 340 fills unoccupied areas of candidate designs 208 with vegetation and parkland. Vegetation module 340 is described in greater detail below in conjunction with FIG. 5.

Geometry engine 200 executes the various modules described above to procedurally generate a plurality of candidate designs 208. Various operations performed by these modules are described below.

Figure 4:
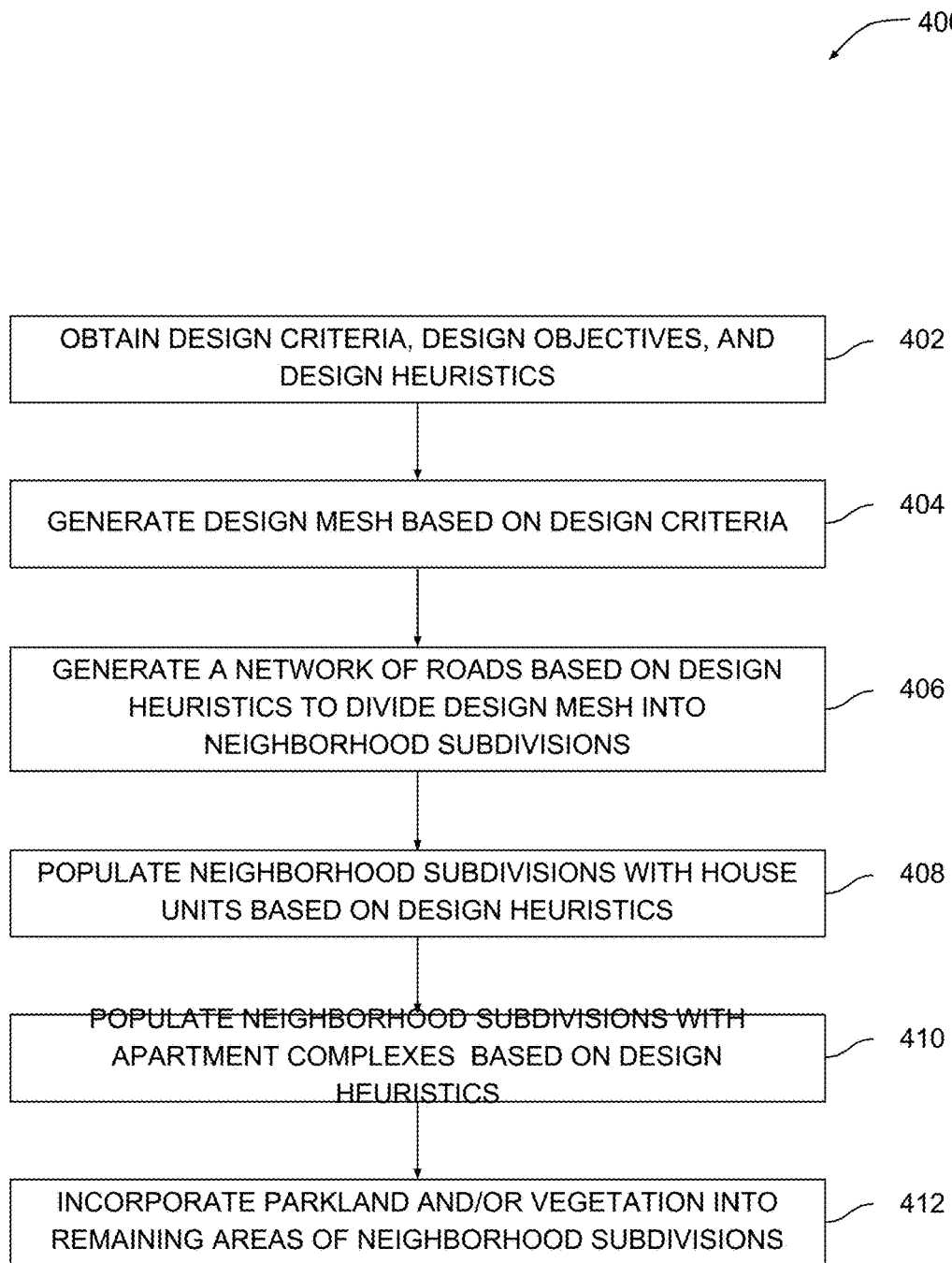
FIG. 4 is a flow diagram of method steps for generating geometry associated with a design option for an urban design project, according to various embodiments of the present invention.

FIG. 4 is a flow diagram of method steps for generating geometry associated with a design option for an urban design project, according to various embodiments of the present invention. Although the method steps are described in conjunction with the systems of FIGS. 1-3, persons skilled in the art will understand that any system configured to perform the method steps in any order falls within the scope of the present invention.

As shown, a method 400 begins at step 402, where geometry engine 200 obtains design criteria 202, design objectives 204, and design heuristics 206 associated with the urban design project. Design criteria 202 can include design constraints that describe features and/or attributes of designs that should be avoided when generating design options 140. Design criteria 202 can also include design requirements that describe features and/or attributes of designs that should be included within design options 140. Design objectives 204 include a set of objective functions that should be maximized or minimized when generating design options 140. Design objectives 204 also indicate a specific topology based on which candidate designs 208 should be generated. Design heuristics 206 include different sets of construction rules for generating candidate designs 208 with topologies that are organizationally similar to an existing topology that may be associated with an existing urban layout.

At step 404, mesh generation module 300 within geometry engine 200 generates a design mesh based on design criteria 202. In particular, mesh generation module 300 performs a sequence of geometrical operations with a property boundary included in design criteria 202. The design mesh conforms to the property boundary and allows additional structures to be placed effectively. FIGS. 5-11 depict an example of how mesh generation module 300 constructs a design mesh.

Figure 13:
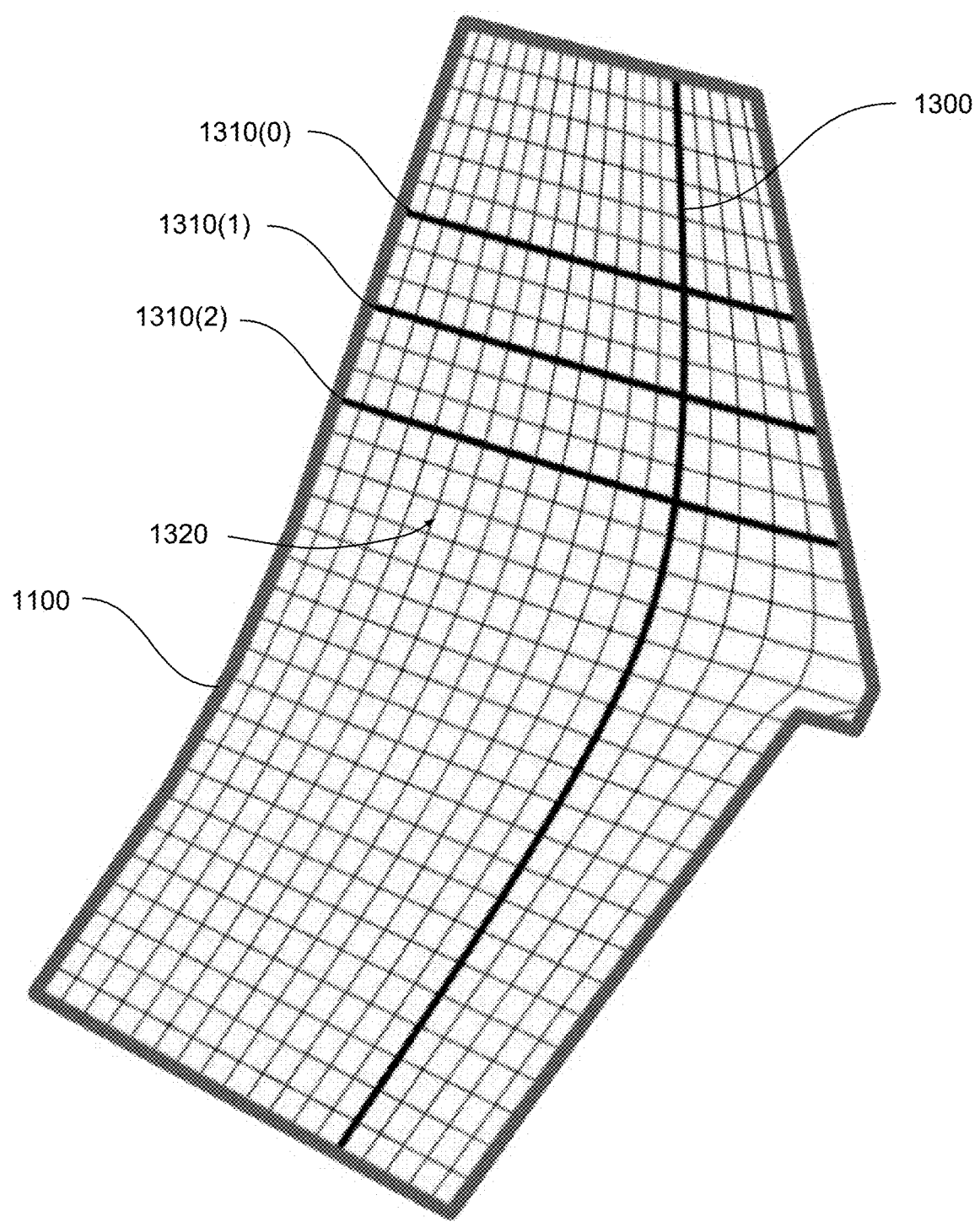
FIG. 13 illustrates portions of the design mesh of FIG. 11 that the neighborhood topology module of FIG. 3 selects to form a network of roads, according to various embodiments of the present invention.
Figure 14:
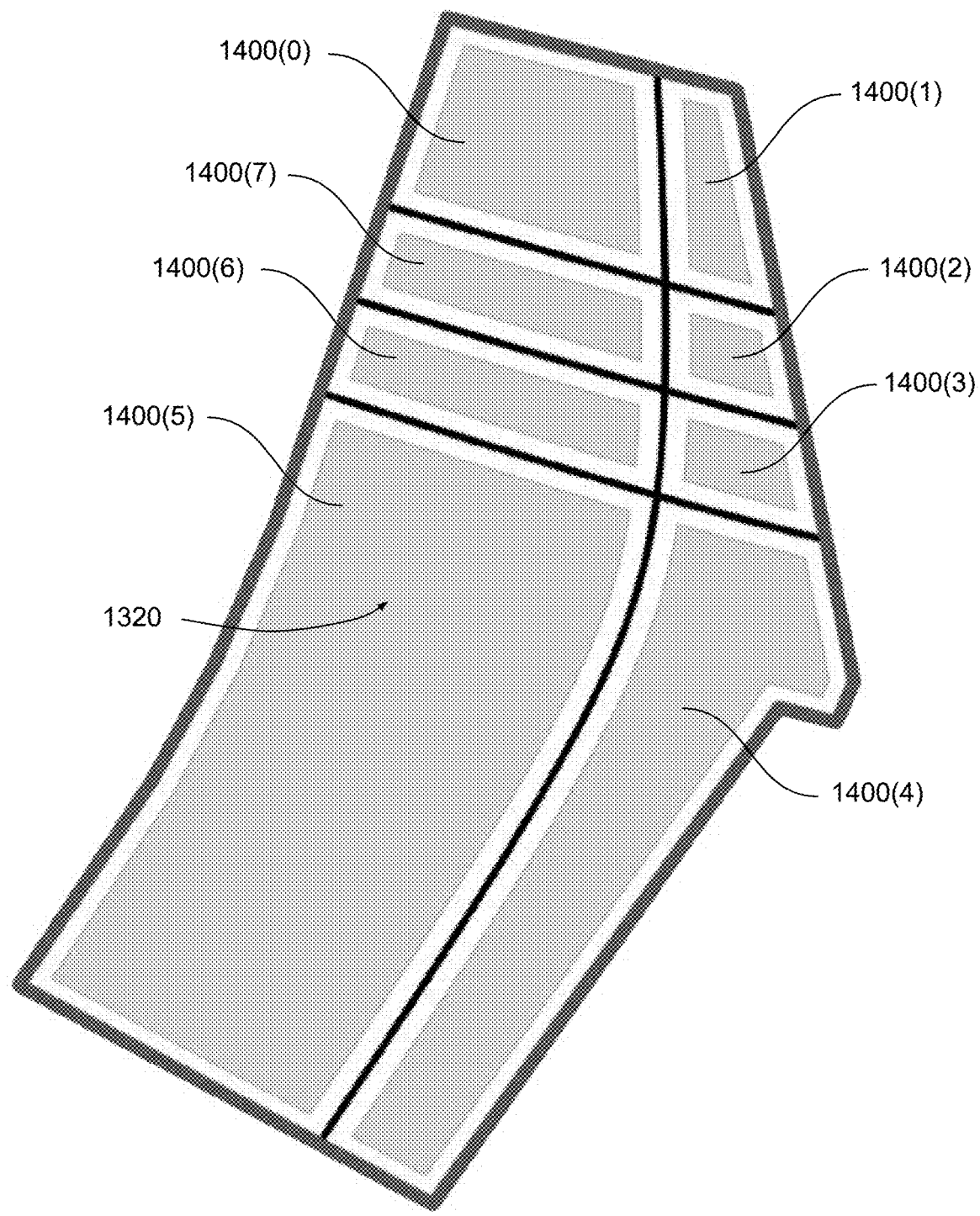
FIG. 14 illustrates how the network of roads of FIG. 13 divides the design mesh into regions, according to various embodiments of the present invention.
Figure 15:
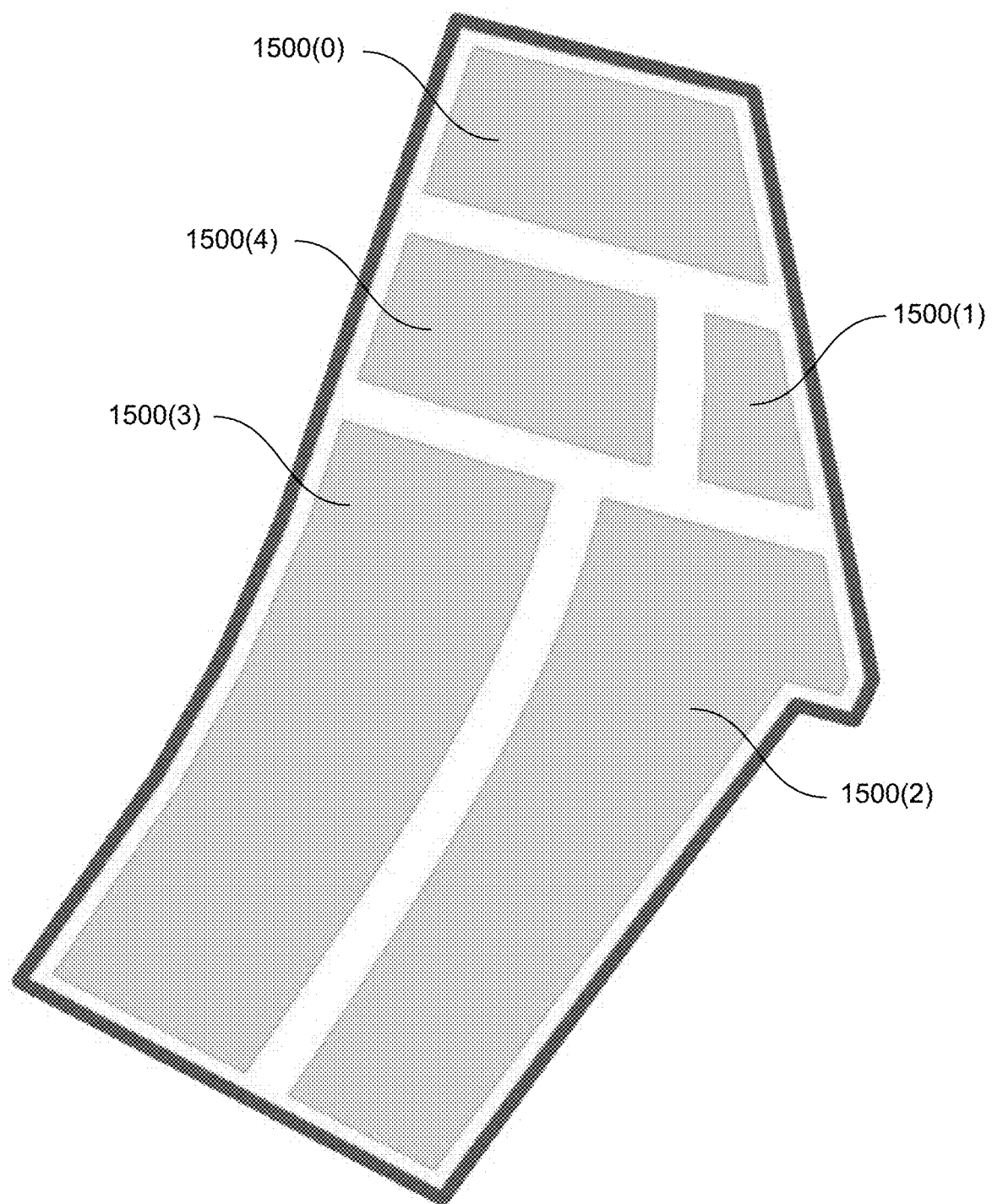
FIG. 15 illustrates how the regions of FIG. 14 are modified to generate neighborhood subdivisions, according to various embodiments of the present invention.

At step 406, neighborhood topology module 310 within geometry engine 200 generates a network of roads based on design heuristics 206 to divide the design mesh into neighborhood subdivisions. The network of roads includes various road segments that are interconnected to form a topology that may resemble a road topology associated with an existing urban layout. Design heuristics 206 include construction rules for generating road topologies that have organizational characteristics in common with the road topology associated with the existing urban layout. For example, the existing urban layout could include long avenues punctuated by short, curved side streets. Design heuristics 206 would include construction rules that cause neighborhood topology module 310 to generate long avenues intersected by short, curved side streets. FIGS. 13-15 depict an example of how neighborhood topology module 310 constructs a network of roads to form neighborhoods.

Figure 17:
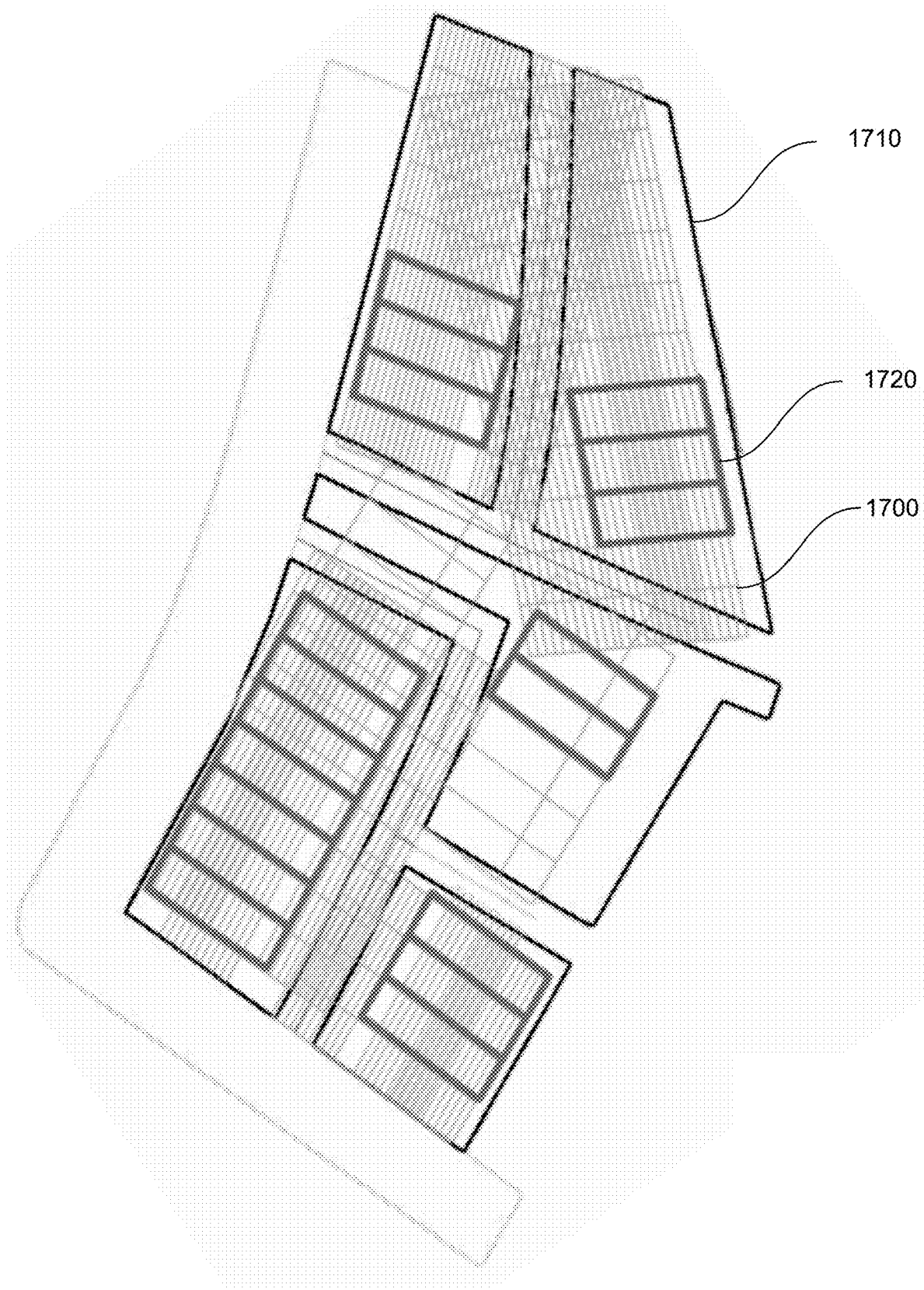
FIG. 17 illustrates a placement that the house topology module of FIG. 3 generates for house units within a neighborhood subdivision, according to various embodiments of the present invention.

At step 408, house topology module 320 within geometry engine 200 populates the neighborhood subdivisions generated at step 406 with house units based on design heuristics 206. Design heuristics 206 include construction rules for placing and arranging house units to reflect the organization of houses in an existing urban layout. For example, the existing urban layout could include rows of 4-6 houses set back from a road by a fixed distance. Design heuristics 206 would include construction rules that cause house topology module 320 to position houses in short rows with a particular street offset. FIG. 17 depicts an example of how house topology module 320 places house units.

Figure 18:
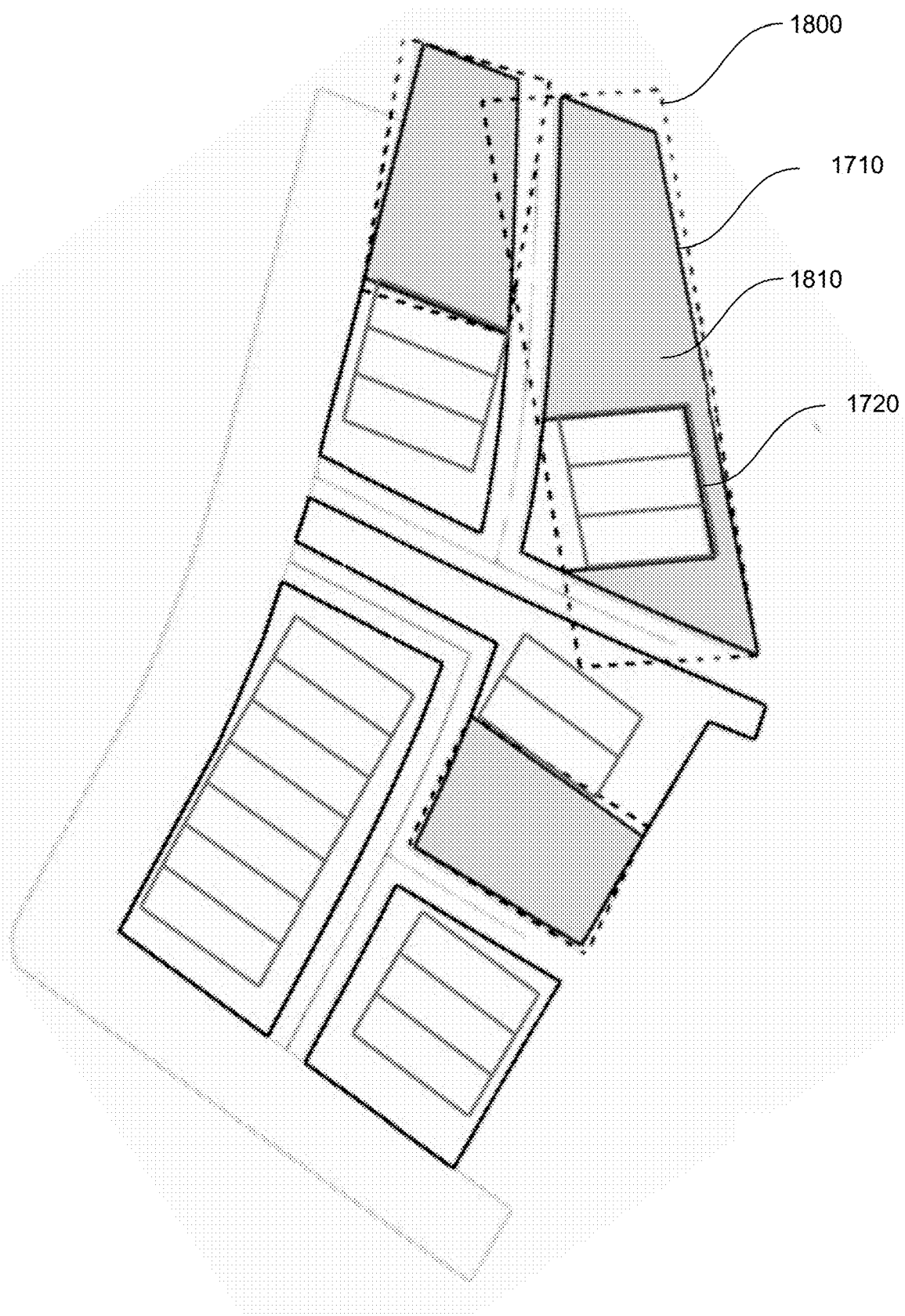
FIG. 18 illustrates unoccupied regions of the neighborhood subdivision of FIG. 17 that are identified by the apartment topology module of FIG. 3, according to various embodiments of the present invention.
Figure 19:
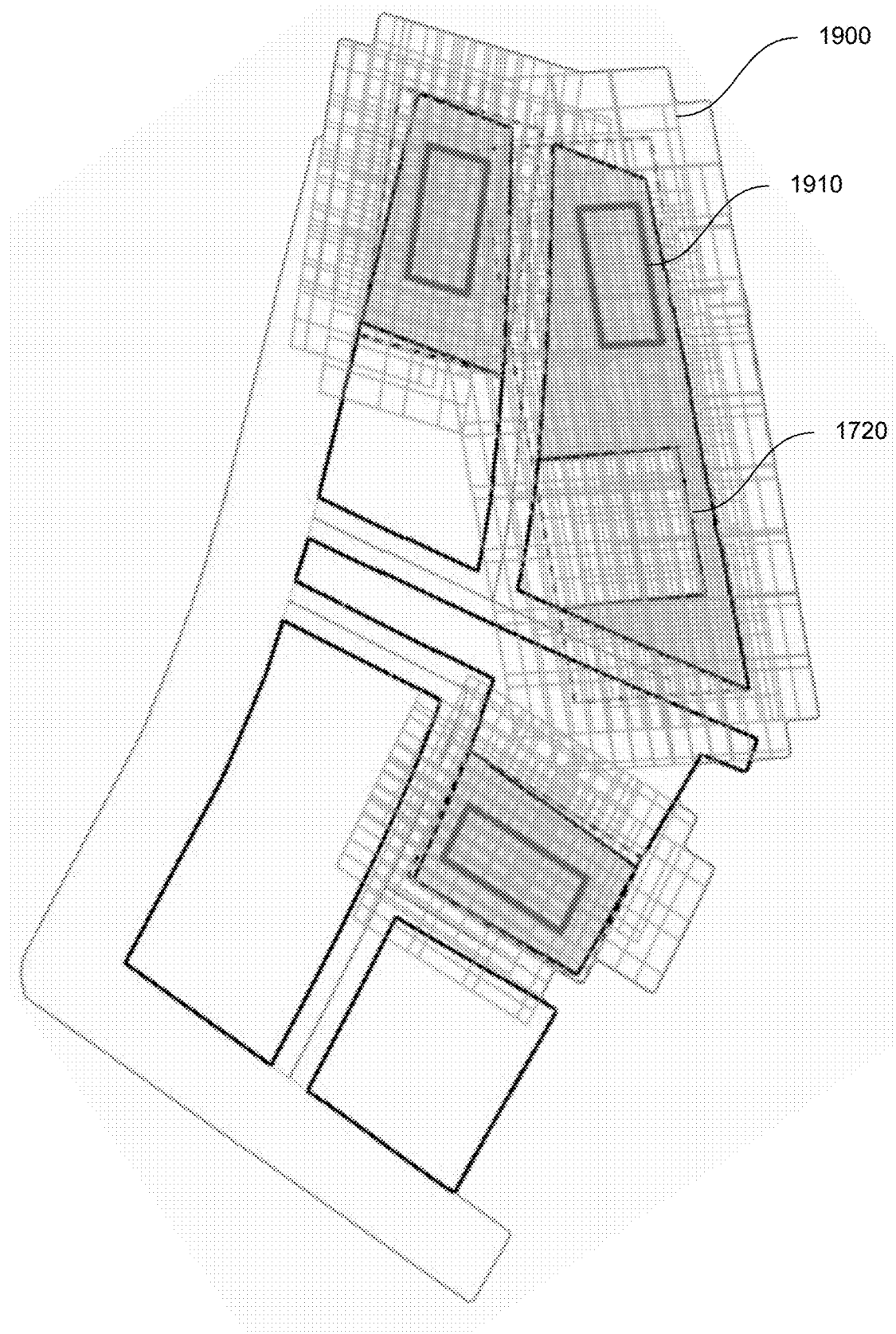
FIG. 19 illustrates a placement that the apartment topology module of FIG. 3 generates for an apartment complex within one of the unoccupied regions of FIG. 18, according to various embodiments of the present invention.
Figure 20:
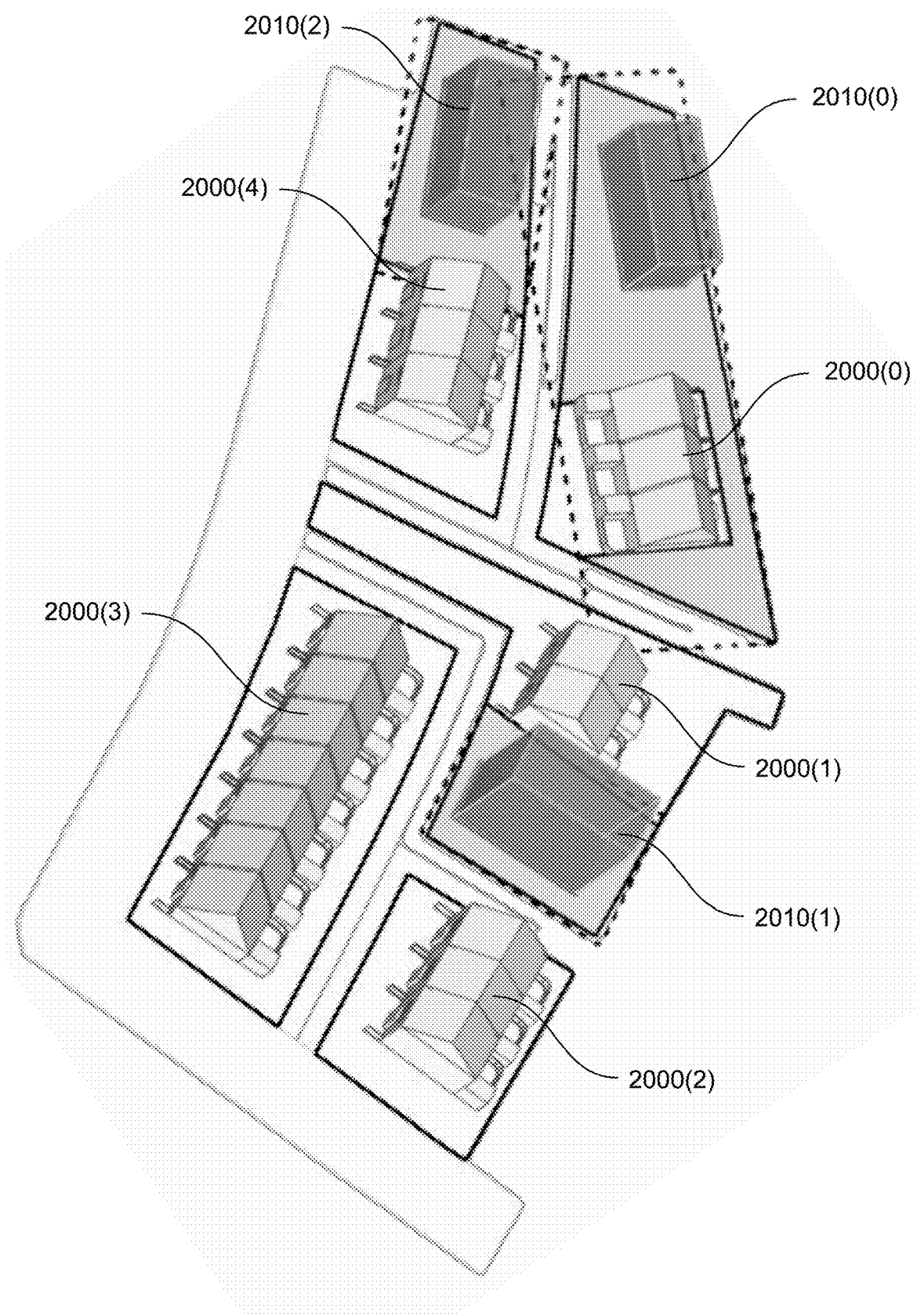
FIG. 20 illustrates a neighborhood layout generated by the house topology module and apartment topology module of FIG. 2, according to various embodiments of the present invention.

At step 410, apartment topology module 330 within geometry engine 200 populates the unoccupied portions of neighborhood subdivision with apartment complexes based on design heuristics 206. Design heuristics 206 include construction rules for placing and arranging apartment complexes to reflect the organization of apartment complexes in an existing urban layout. For example, the existing urban layout could include apartment complexes with a longer side that runs along the closest major cross street. Design heuristics 206 would include construction rules that cause geometry engine 200 to position apartment complexes to follow this same pattern. FIGS. 18-20 depict an example of how geometry engine 200 places apartment units.

At step 410, vegetation module 340 within geometry engine 200 incorporates parkland and/or vegetation into remaining areas of neighborhood subdivisions. Geometry engine 200 can implement any technically feasible approach to placing vegetation, including brute force techniques as well as randomized approaches.

The various modules included in geometry engine 200 implement different steps of the method 400 to generate candidate designs 208. In one embodiment, mesh generation module 300 implements steps 400 and 402 just once when generating a set of candidate designs 208, and then the remaining modules within geometry engine 200 implement steps 406, 408, 410, and 412 multiple times to construct different geometry for each different candidate design 208. An advantage of the approach described above is that candidate designs are automatically generated to conform to a property boundary while also resembling an existing urban layout.

Mesh Generation Module

Mesh generation module 300 of FIG. 3 performs a sequence of geometric construction steps to generate a design mesh that conforms to a property boundary associated with a property to be developed. FIGS. 5-11 depict various examples of how mesh generation 300 performs these construction steps.

Figure 5:
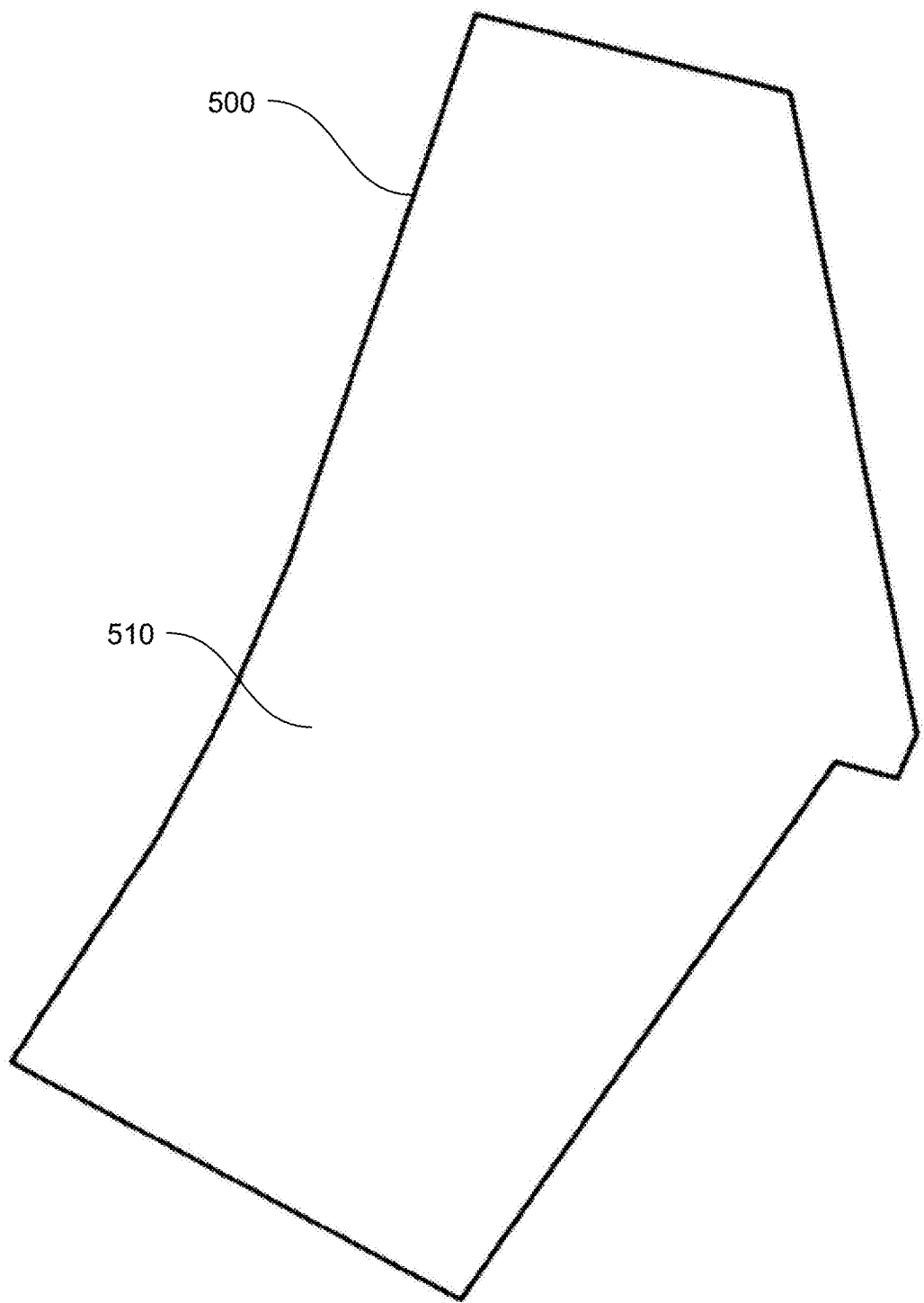
FIG. 5 illustrates a property boundary that is processed by the mesh generation module of FIG. 3 to generate a design mesh, according to various embodiments of the present invention.

FIG. 5 illustrates a property boundary that is processed by the mesh generation module of FIG. 3 to generate a design mesh, according to various embodiments of the present invention. As shown, property boundary 500 surrounds a design space 510. Property boundary 500 has a semi-irregular contour with some long edges along with several small edges. Property boundaries with the level of irregularity shown may be common in urban development projects. Designers oftentimes have difficulty generating designs that efficiently and effectively use the design space encompassed by an irregular property boundary such as that shown. Among other things, structures to be placed within that space may have regular shapes that do not align with irregularities in the property boundary. During the generation of candidate designs 208, geometry engine 200 obtains property boundary 500 from design criteria 202 and identifies design space 510. Geometry engine 200 then performs a sequence of additional steps described in greater detail below to generate the design mesh.

Figure 6:
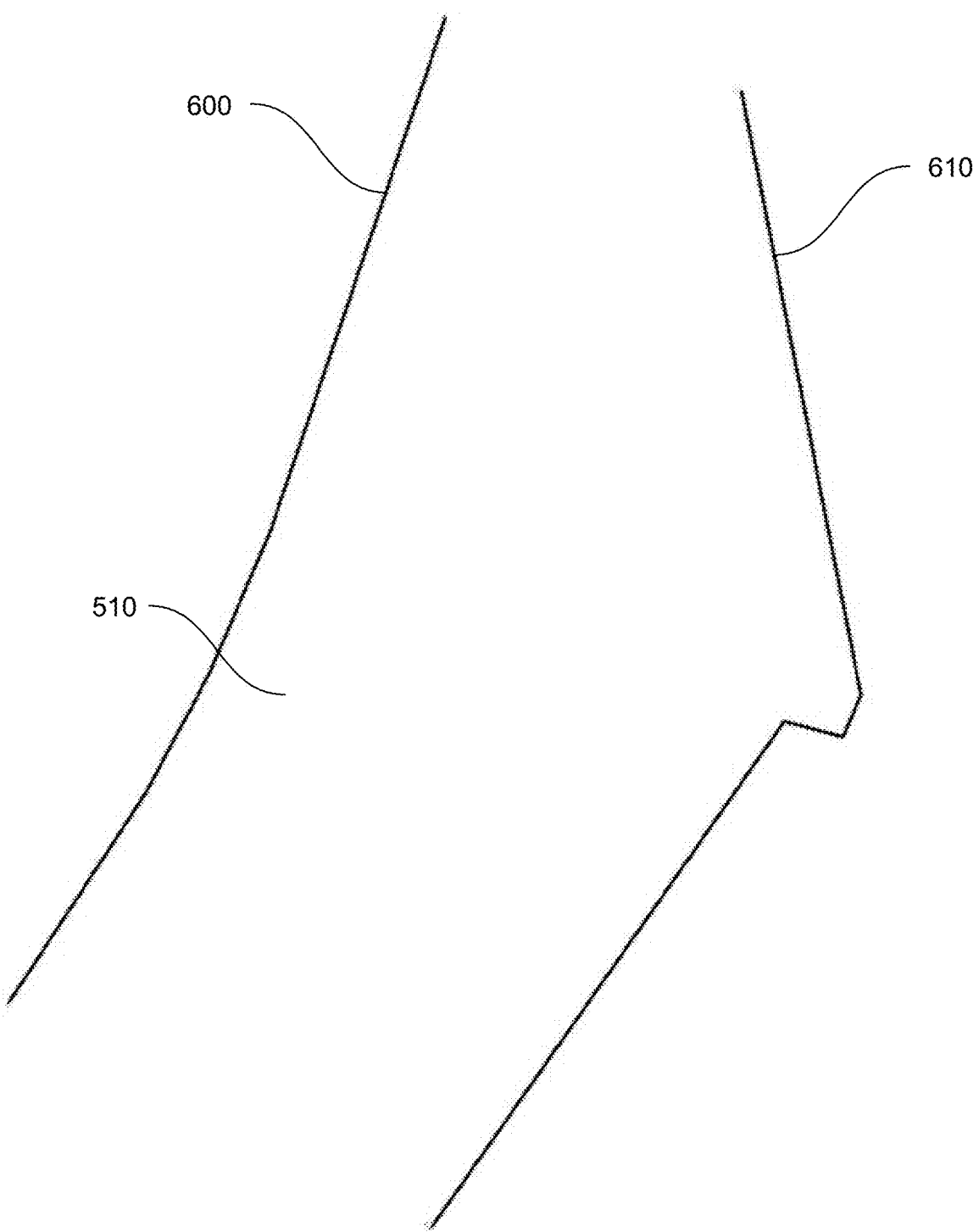
FIG. 6 illustrates portions of the property boundary of FIG. 5 that reside on opposite sides of a design space, according to various embodiments of the present invention.

FIG. 6 illustrates portions of the property boundary of FIG. 5 that reside on opposite sides of a design space, according to various embodiments of the present invention. As shown, portions 600 and 610 reside on opposite sides of design space 510. Geometry engine 200 can identify portions 600 and 610 using several different techniques. In one embodiment, geometry engine 200 identifies continuous sequences of line segments with an average orientation that is closer to vertical than horizontal. In another embodiment, geometry engine 200 eliminates any horizontal line segments having greater than a threshold length and retains the remaining portions of property boundary 500.

Figure 7:
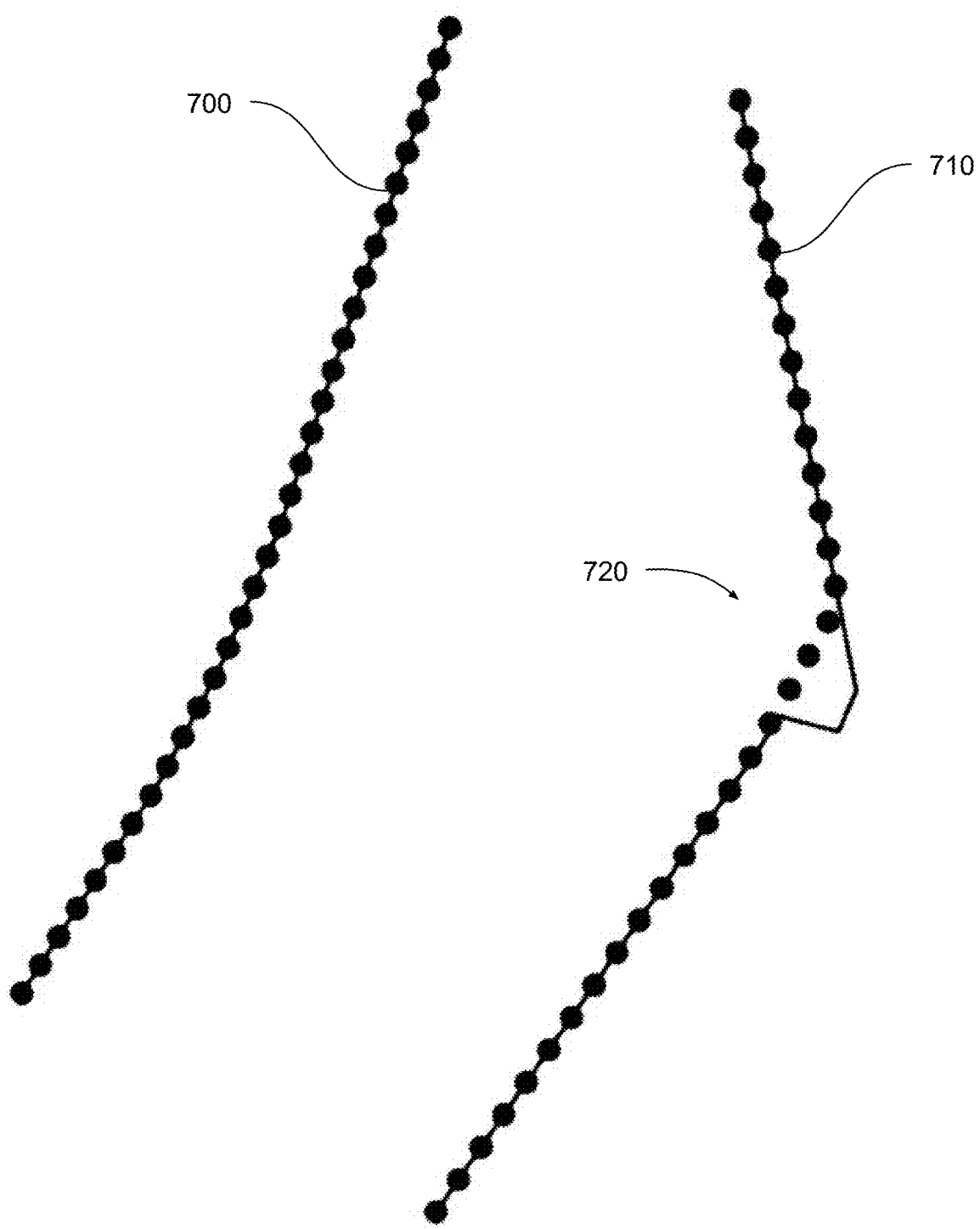
FIG. 7 illustrates the portions of the property boundary of FIG. 6 discretized into opposing vertices, according to various embodiments of the present invention.

FIG. 7 illustrates the portions of the property boundary of FIG. 6 discretized into opposing vertices, according to various embodiments of the present invention. As shown, vertices 700 represent portion 600 and vertices 710 represent portion 610. Vertices 700 and 710 generally includes the same number of vertices. Geometry engine 200 can generate vertices 700 and 710 via any technically feasible approach to downsampling and/or discretization. In one embodiment, geometry engine 200 may perform a smoothing operation prior to discretizing a given portion in order to avoid discretizing very small line segments. For example, geometry engine 200 could smooth area 720 prior to discretizing portion 610 when generating vertices 710.

Figure 8:
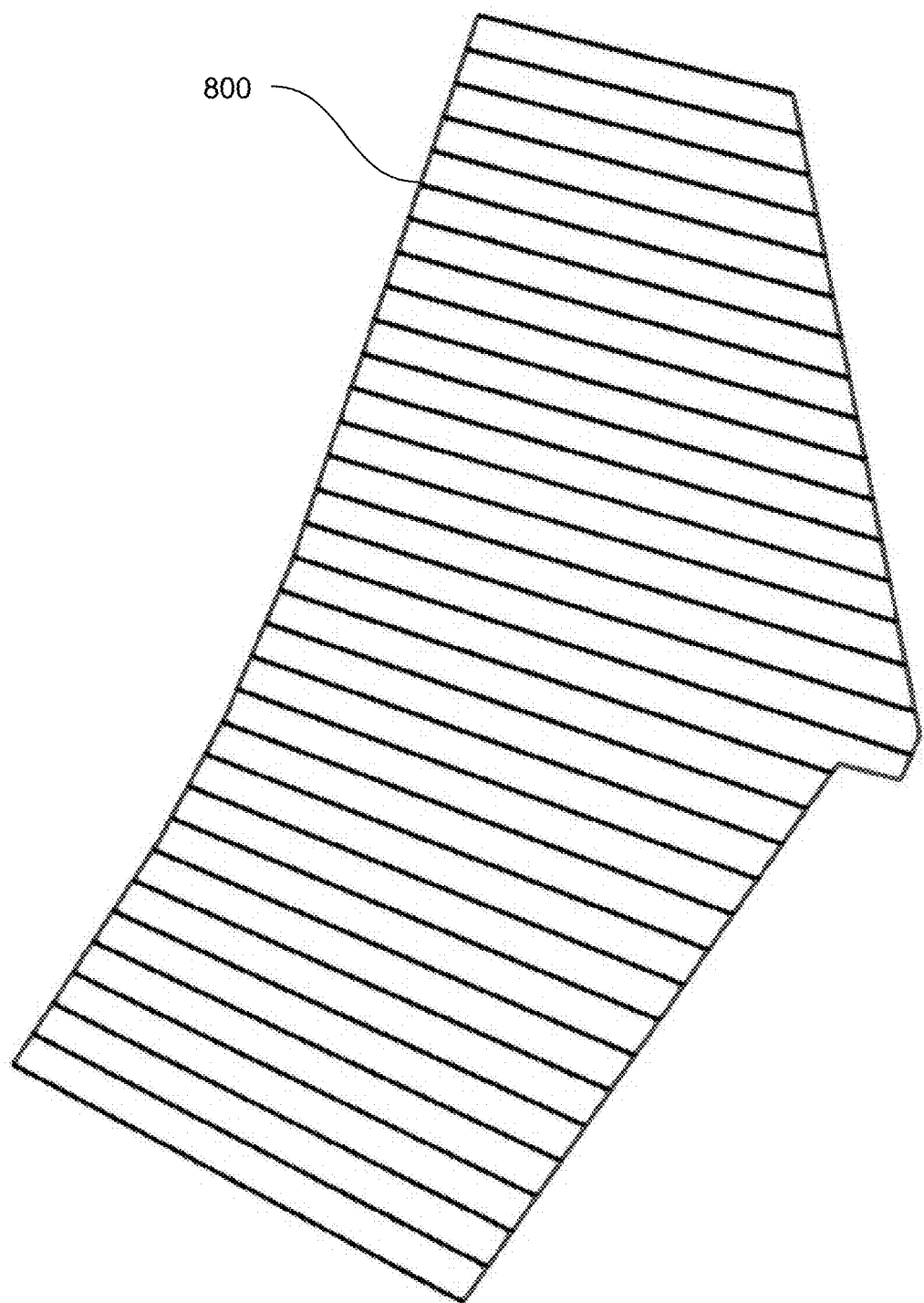
FIG. 8 illustrates the opposing vertices of FIG. 7 connected to form a set of curves, according to various embodiments of the present invention.

FIG. 8 illustrates the opposing vertices of FIG. 7 connected to form a set of curves, according to various embodiments of the present invention. As shown, curves 800 span between opposing vertices included in vertices 700 and 710. As mentioned, vertices 700 and 710 include the same number of vertices. Geometry engine 200 generates curves 800 by sequentially connecting each vertex in vertices 700 to a corresponding vertex in vertices 710. Each curve 800 can have some degree of curvature or can be entirely straight. In one embodiment, geometry engine 200 extends any curves that do not meet property boundary 500 in order to connect those curves to property boundary 500.

Figure 9:
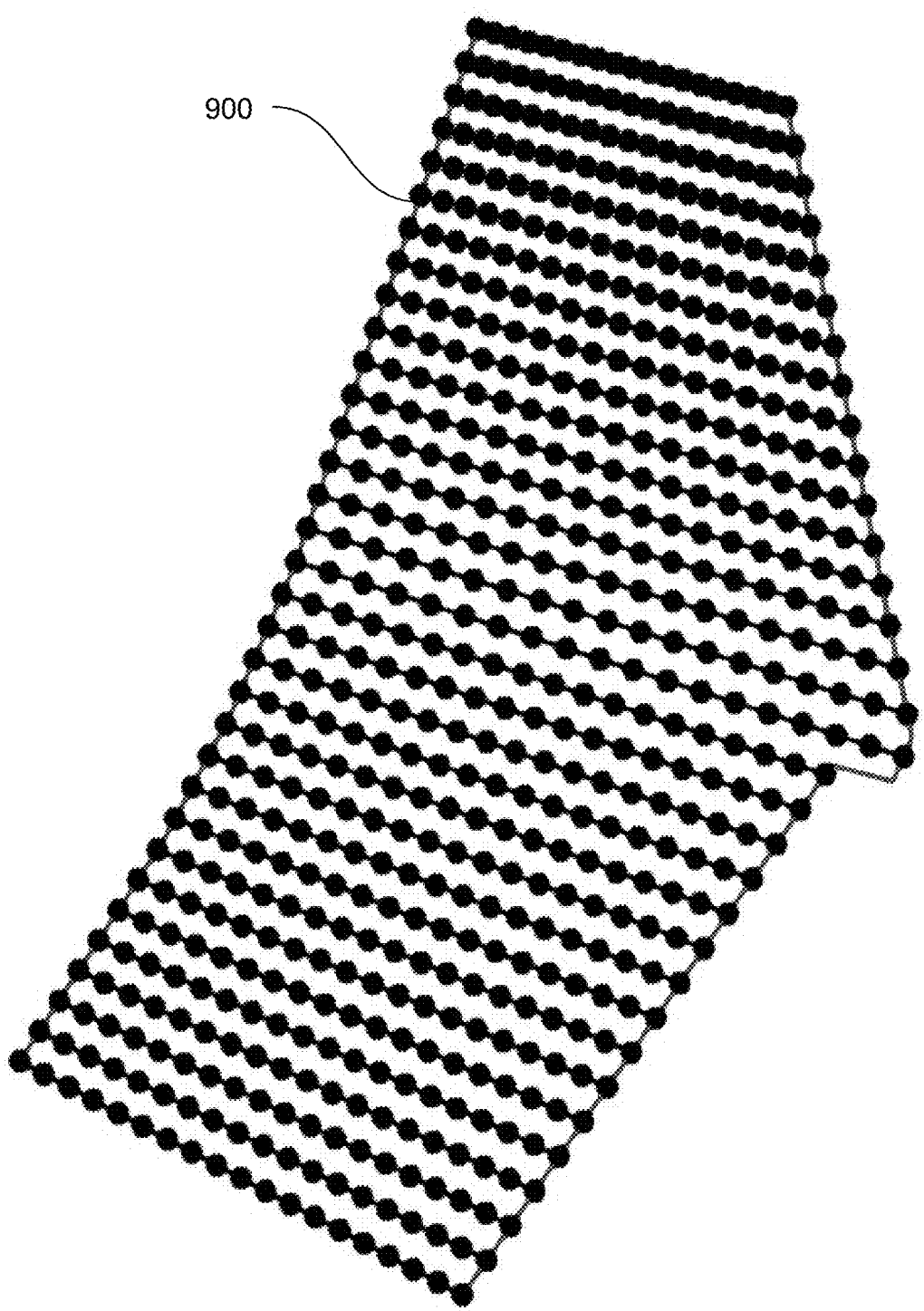
FIG. 9 illustrates the curves of FIG. 8 discretized into a set of vertices, according to various embodiments of the present invention.

FIG. 9 illustrates the curves of FIG. 8 discretized into a set of vertices, according to various embodiments of the present invention. As shown, vertices 900 span design area 510 between the opposing portions of property boundary 500. Geometry engine 200 generates vertices 900 by discretizing curves 800 of FIG. 8. Vertices 900 are disposed in a regular lattice that generally conforms to property boundary 500 and covers all portions of design area 510 with approximately the same density of vertices.

Figure 10:
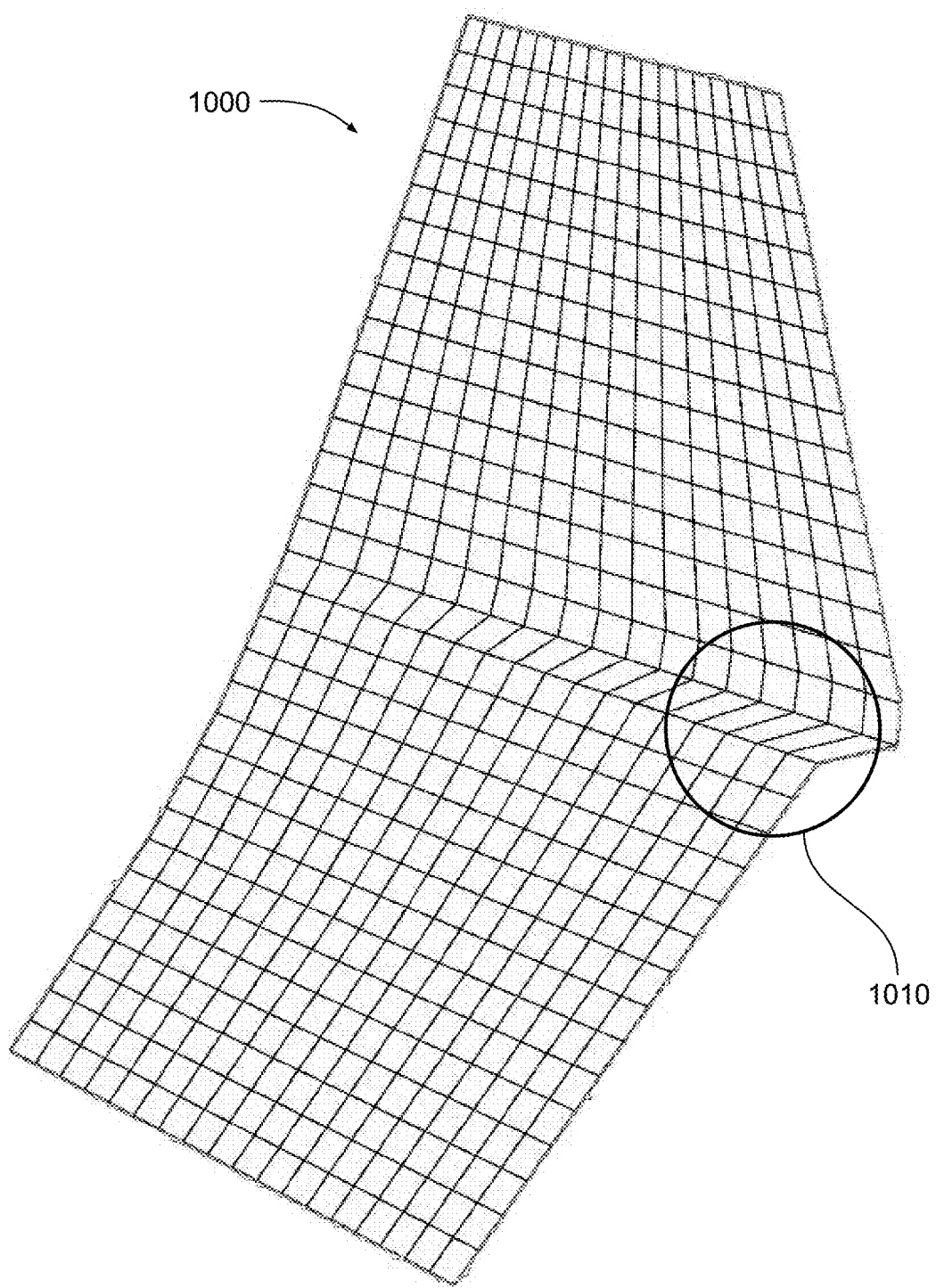
FIG. 10 illustrates the set of vertices of FIG. 9 connected to form a rough mesh, according to various embodiments of the present invention.

FIG. 10 illustrates the set of vertices of FIG. 9 connected to form a rough mesh, according to various embodiments of the present invention. As shown, rough mesh 1000 is a mesh of polygons. Geometry engine 200 generates rough mesh 1000 by connecting adjacent vertices included vertices 900. Rough mesh 1000 may have regions with slightly irregular polygons, such as region 1010, that geometry engine 200 subsequently simplifies.

Figure 11:
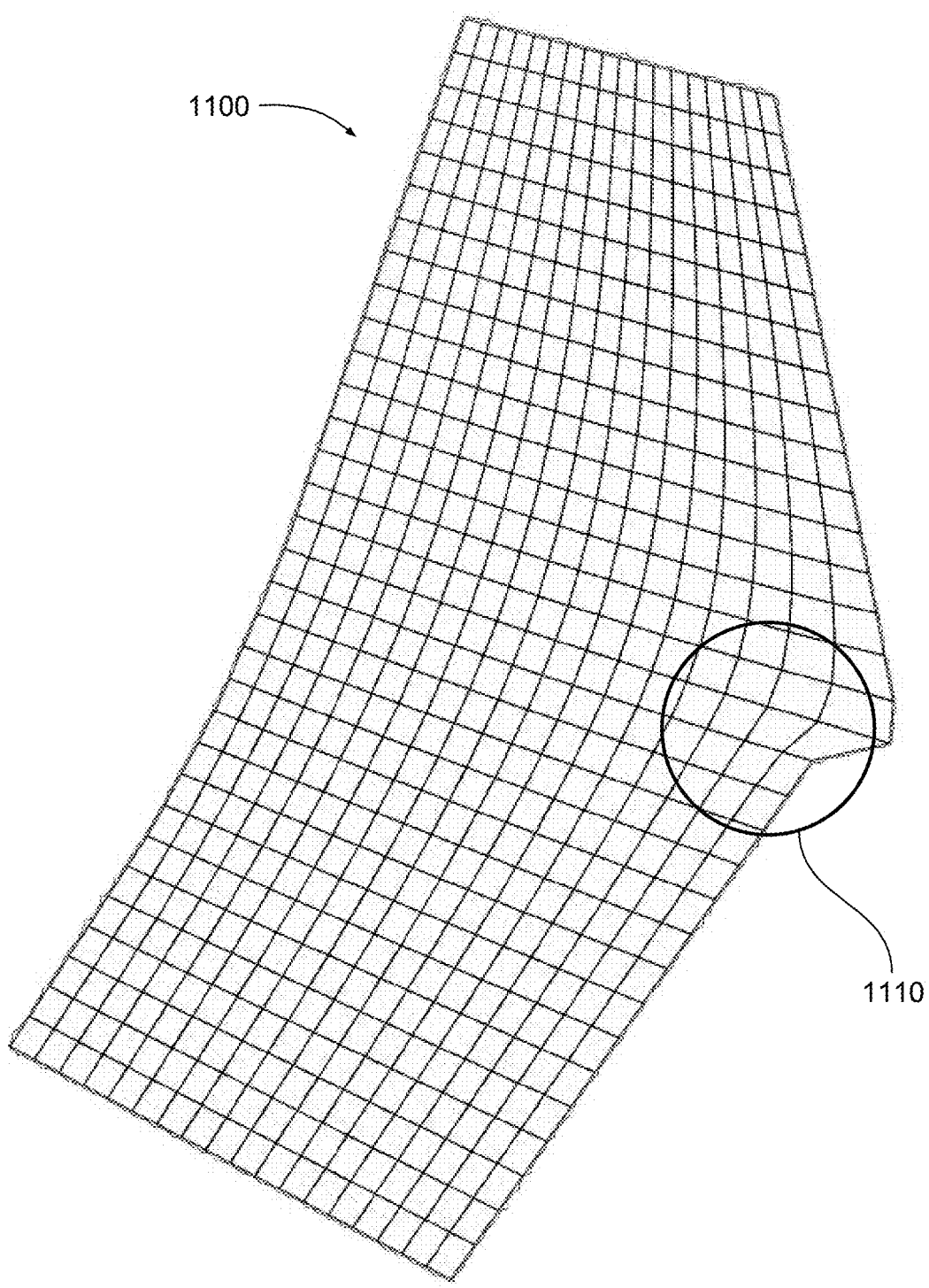
FIG. 11 illustrates how the rough mesh of FIG. 10 is relaxed to form a design mesh, according to various embodiments of the present invention.

FIG. 11 illustrates how the rough mesh of FIG. 10 is relaxed to form a design mesh, according to various embodiments of the present invention. As shown, design mesh 1100 is a relaxed version of rough mesh 1000. For example, region 1110 includes more regular polygons than region 1010 of rough mesh 1000. Geometry engine 200 can perform any technically feasible approach to simplifying and/or relaxing polygonal meshes when generating design mesh 1100.

Referring generally to FIGS. 5-11, mesh generation module 300 performs the techniques described above sequentially to generate design mesh 1100 based on a given property boundary 500. In practice, geometry engine 200 generates one design mesh 1100 based on which all candidate designs 208 are generated. In one embodiment, mesh generation module 300 may instead generate a different design mesh for some or all candidate designs 208.

Figure 12:
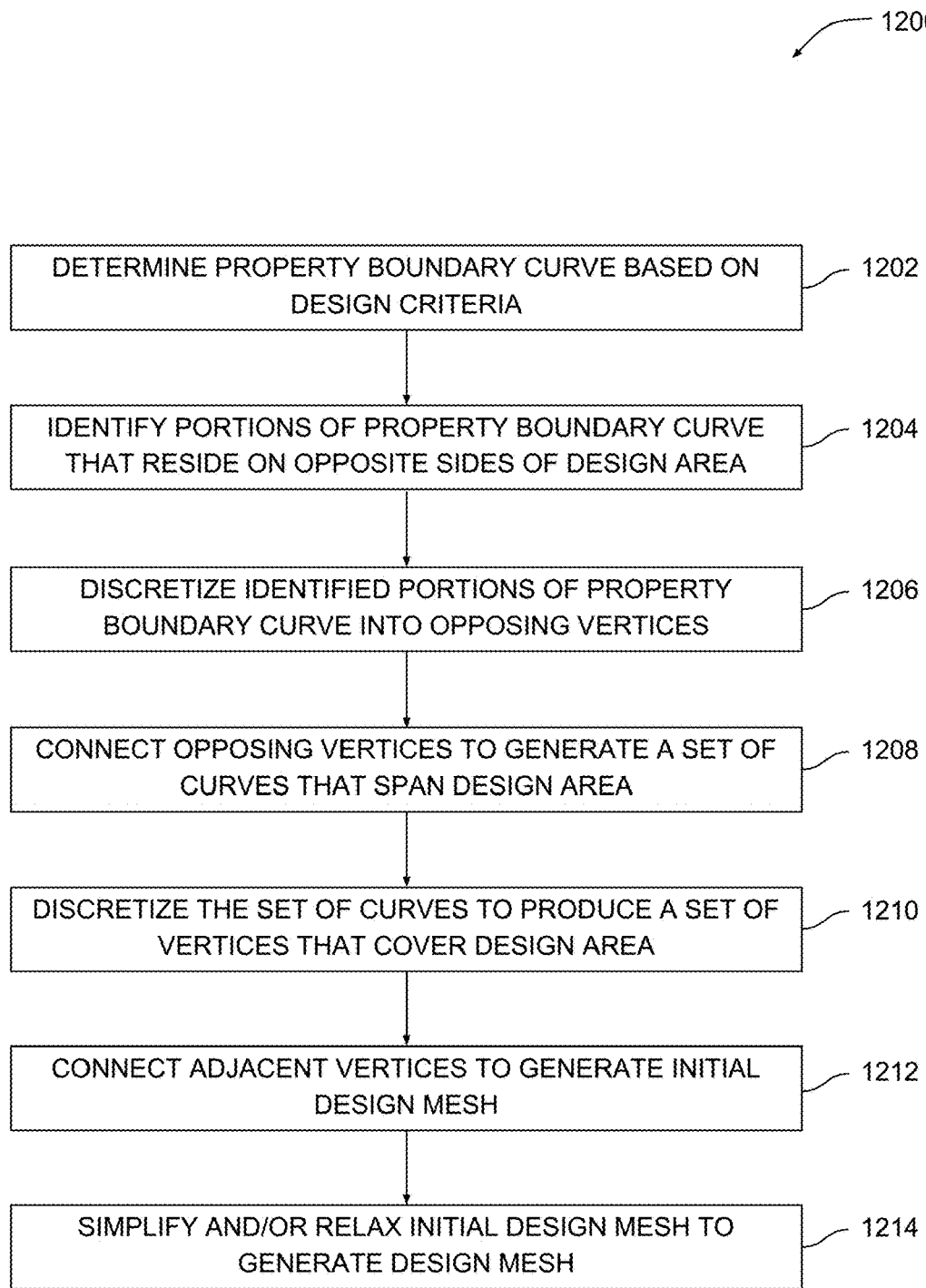
FIG. 12 is a flow diagram of method steps for generating a design mesh for a design option based on one or more property boundaries, according to various embodiments of the present invention.

FIG. 12 is a flow diagram of method steps for generating a design mesh for a design option based on one or more property boundaries, according to various embodiments of the present invention. Although the method steps are described in conjunction with the systems of FIGS. 1-11, persons skilled in the art will understand that any system configured to perform the method steps in any order falls within the scope of the present invention.

As shown, a method 1200 begins at step 1202, where mesh generation module 300 determines a property boundary based on design criteria 202. The property boundary surrounds a design area associated with the urban development project. The property boundary can be defined as a set of curves, line segment, individual points, and so forth. Step 1202 is described by way of example above in conjunction with FIG. 5.

At step 1204, mesh generation module 300 identifies portions of the property boundary that reside on opposite sides of a design area. The identified portions could be, for example, East-West boundaries of the design area. In one embodiment, mesh generation module 300 may identify opposing portions of the property boundary by determining two sets of line segments that, on average, are positioned more vertical than horizontal (or vice versa). Step 1204 is described by way of example above in conjunction with FIG. 6.

At step 1206, mesh generation module 300 discretizes the portions of the property boundary identified at step 1204 into sets of opposing vertices. Mesh generation module 300 generates the same number of vertices for each portion of the property boundary using any technically feasible approach to discretization. The vertices associated with a given portion can have equal spacing but need not have the same spacing as vertices in associated with another portion. Step 1206 is described by way of example above in conjunction with FIG. 7.

At step 1208, mesh generation module 300 connects opposing vertices to generate a set of curves that span the design area. For example, mesh generation module 300 could sequentially process each vertex in one set of opposing vertices along with a corresponding vertex in another set of opposing vertices and connect the two vertices with a curve. The curve can have any degree of curvature, including zero curvature. Step 1208 is described by way of example above in conjunction with FIG. 8.

At step 1210, mesh generation module 300 discretizes the set of curves to produce a set of vertices that cover the design area. In so doing, mesh generation module 300 discretizes each curve using any technically feasible approach to downsampling and/or discretization. The spacing of vertices within a given discretized curve can be equal but need not be the same as the spacing in other discretized curves. Step 1210 is described by way of example above in conjunction with FIG. 9.

At step 1212, mesh generation module 300 connects adjacent vertices to generate an initial design mesh. For example, mesh generation module 300 could determine, for a given vertex, the four closest vertices to that vertex and then generate short line segments coupling the vertex to those four closest vertices, thereby generating a portion of the initial mesh. The initial mesh may have irregularities that can be smoothed in subsequent steps. Step 1212 is described by way of example above in conjunction with FIG. 10.

At step 1214, mesh generation module 300 simplifies and/or relaxes the rough design mesh generated at step 1212 to generate a design mesh. Mesh generation module 300 can implement any technically feasible approach to mesh relaxation to relax and/or simplify the rough design mesh when generating the design mesh. In one embodiment, mesh generation module 300 generates a different design mesh for each candidate design 208. In practice, mesh generation module 300 need only generate one design mesh, though. Step 1214 is described by way of example above in conjunction with FIG. 11.

Mesh generation module 300 implements the method 1200 during the iterative design process described above in conjunction with FIG. 2. Once the design mesh is generated, neighborhood topology module 310 implements the techniques described below in conjunction with FIG. 13-16.

Neighborhood Topology Module

Neighborhood topology module 310 performs a sequence of geometric construction steps to generate a network of roads that subdivide the design mesh into neighborhoods, thereby forming a neighborhood topology. FIGS. 13-15 depict examples of how neighborhood topology module 310 performs these construction steps FIG. 13 illustrates portions of the design mesh of FIG. 11 that the neighborhood topology module of FIG. 3 selects to form a network of roads, according to various embodiments of the present invention. As shown, design mesh 1100 includes a longitudinal line segment 1300 and latitudinal line segments 1310(0), 1310(1), and 1310(2). Neighborhood topology module 310 selects line segments 1310 and 1300 and then assigns a road type to each line segment to generate a network 1320 of roads. Neighborhood topology module 310 performs these operations based on design heuristics 206. Accordingly, network 1320 of roads has a topology with particular characteristics. These characteristics can be derived from a road topology associated with an existing urban layout.

For example, the existing urban layout could include a road topology where long avenues span areas of land and are intersected by perpendicular short streets. Design heuristics 208 would then include construction rules that cause network topology module 310 to select one or more long avenues, such as longitudinal line segment 1300, and several shorter streets, such as latitudinal line segments 1310. Neighborhood topology module 310 selects a different set of line segments for each different candidate design 208. Accordingly, candidate designs 208 generally have different road topologies that have common characteristics.

FIG. 14 illustrates how the network of roads of FIG. 13 divides the design mesh into regions, according to various embodiments of the present invention. As shown, design mesh 1100 includes regions 1400(0) through 1400(7) that reside between portions of network 1320. Some of the larger regions 1400 form neighborhood subdivisions, while some of the smaller regions 1400 can be merged together to form neighborhood subdivisions.

FIG. 15 illustrates how the regions of FIG. 14 are modified to generate neighborhood subdivisions, according to various embodiments of the present invention. As shown, neighborhood topology module 310 adjusts regions 1400 of FIG. 14 via various techniques to form neighborhood subdivisions 1500. In particular, neighborhood topology module 310 merges regions 1400(0) and 1400(1) to form neighborhood subdivisions 1500(0), merges regions 1400(2) and 1400(3) to form neighborhood subdivision 1500(1), and merges regions 1400(6) and 1400(7) to form neighborhood subdivision 1500(4).

Neighborhood topology module 310 selects these particular regions 1400 to merge with one another based on design heuristics 206. For example, design heuristics 206 could indicate that neighborhood subdivisions 1500 should have a minimum size in order to be geometrically consistent with an existing urban layout. Accordingly, neighborhood topology module 310 would merge adjacent regions 1400 that do not meet this minimum size.

Neighborhood topology module 310 also adjusts the dimensions of regions 1400(4) and 1400(5) to generate neighborhood subdivisions 1500(2) and 1500(3), respectively. Neighborhood topology module 310 selects these particular regions to adjust based on design heuristics 206. For example, design heuristics 206 could indicate that neighborhood subdivisions 1500 should have only a specific range of aspect ratios be geometrically consistent with an existing urban layout. Thus, neighborhood topology module 310 could determine that region 1400(4) is too narrow and should be adjusted to form neighborhood subdivision 1500 (2). Neighborhood topology module 310 could also determine that region 1400(5) can safely be adjusted to compensate for the expansion of region 1400(4) without significantly impacting the aspect ratio of that region.

Referring generally to FIGS. 13-15, neighborhood topology module 310 performs the above operations based on design heuristics 206 in order to generate roads and neighborhood subdivisions having topologies that may resemble those associated with existing urban layouts. In one embodiment, a user may select one or more urban layouts as starting points for the generation of candidate designs 208, and neighborhood topology module 320 may then implement corresponding design heuristics 206 when constructing road and neighborhood geometry for those candidate designs 208.

Figure 16:
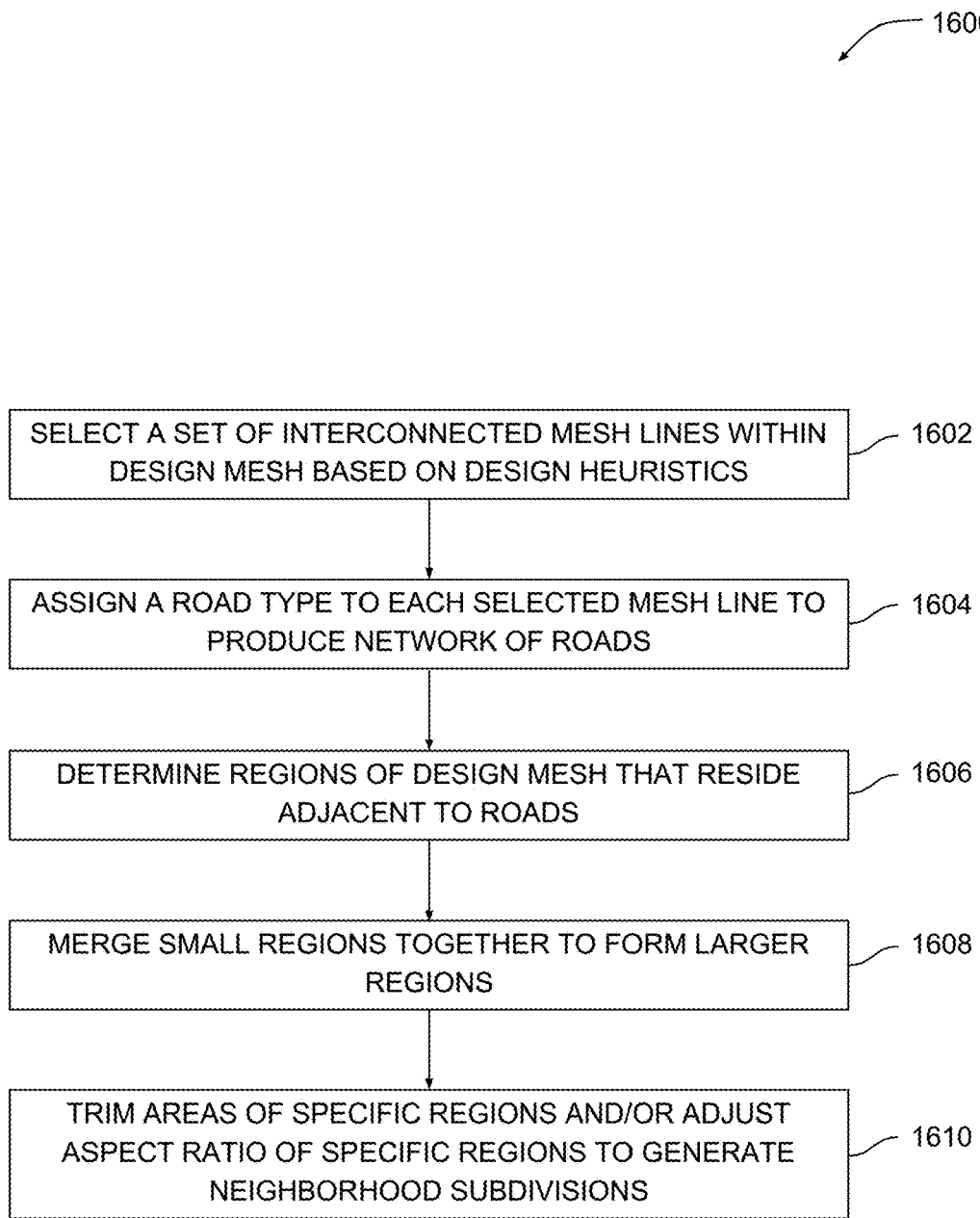
FIG. 16 is a flow diagram of method steps for generating road and neighborhood topologies for a design option, according to various embodiments of the present invention.

FIG. 16 is a flow diagram of method steps for generating road and neighborhood topologies for a design option, according to various embodiments of the present invention. Although the method steps are described in conjunction with the systems of FIGS. 1-15, persons skilled in the art will understand that any system configured to perform the method steps in any order falls within the scope of the present invention.

As shown, a method 1600 begins at step 1602, where neighborhood topology module 310 selects a set of interconnected mesh lines within the design mesh generated via mesh generation module 300. Neighborhood topology module 310 selects the set of interconnected mesh lines based on design heuristics 208. Design heuristics 208 include construction rules for selecting portions of the design mesh to serve as roads. These construction rules can be derived from the organization of roads within an existing urban layout. Step 1600 is described by way of example above in conjunction with FIG. 13.

At step 1604, neighborhood topology module 310 assigns a road type to each selected mesh line to produce a network of roads. The network of roads may have similar characteristic features compared to an existing network of roads found in an existing urban layout. For example, the network of roads could include concentric circles of avenues intersected by radially spaced streets. Step 1604 is also described by way of example above in conjunction with FIG. 13.

At step 1606, neighborhood topology module 310 determines regions of the design mesh that reside adjacent to the roads generated via steps 1602 and 1604. In doing so, neighborhood topology module 310 may identify any contiguous portions of the design mesh that have not been selected as a road during steps 1602 and 1604. The determined regions can have any size, although regions that are too small. Step 1606 is described by way of example above in conjunction with FIG. 14.

At step 1608, neighborhood topology module 310 merges smaller regions together to form larger regions. Neighborhood topology module 310 identifies regions that should be merged based on design heuristics 206 in order to generate regions having a distribution of sizes that is similar to an existing urban layout. Step 1608 is described by way of example above in conjunction with FIG. 15.

At step 1610, neighborhood topology module 310 trims areas of specific regions and/or adjusts the aspect ratio of specific regions to generate neighborhood subdivisions. Neighborhood topology module 310 can trim regions to smooth irregular boundaries. Neighborhood topology module 310 can adjust the aspect ratio of regions to maintain consistency with other regions based on design heuristics 206. Step 1610 is also described by way of example above in conjunction with FIG. 15.

Neighborhood topology module 310 implements the method 1600 during the iterative design process described above in conjunction with FIG. 2. Once the network of roads and neighborhood subdivisions are generated, house topology module 320 and apartment topology module 330 and implement the techniques described below in conjunction with FIGS. 17-21.

House Topology Module and Apartment Topology Module

House topology module 320 and apartment topology module 330 implement similar operations and are therefore described in conjunction with one another. Both of these modules perform a sequence of geometric construction steps to place dwelling units within the neighborhood subdivisions discussed above. FIG. 17 depicts an example of how house topology module 320 places house units within neighborhood subdivisions. FIG. 18-20 depict examples of how apartment topology module 330 places apartment complexes within neighborhood subdivisions.

FIG. 17 illustrates a placement that the house topology module of FIG. 3 generates for house units within a neighborhood subdivision, according to various embodiments of the present invention. As shown, a search grid 1700 is projected over a neighborhood subdivision 1710. House topology module 320 generates search grid 1700 in order to perform a brute force search optimization to determine a specific position for a group 1720 of house units. In one embodiment, house topology module 320 may analyze each possible placement of group 1720 within search grid 1700 and select the placement that maximizes the number of houses. During the search optimization, house topology module 320 generates different placements within search grid 1700 based on design heuristics 206. Design heuristics 206 could indicate, for example, rules for placing houses in a manner that is consistent with an arrangement of houses included in an existing urban layout.

FIG. 18 illustrates unoccupied regions of the neighborhood subdivision of FIG. 17 that are identified by the apartment topology module of FIG. 3, according to various embodiments of the present invention. As shown, apartment topology module 330 projects a search grid outline 1800 over neighborhood subdivision 1710 in order to identify unoccupied region 1810 of neighborhood subdivision 1710. Unoccupied region 1810 does not include any house units and is available for placing apartment complexes.

FIG. 19 illustrates a placement that the apartment topology module of FIG. 3 generates for an apartment complex within one of the unoccupied regions of FIG. 18, according to various embodiments of the present invention. As shown, apartment topology module 330 projects search grid 1900 within search grid outline 1800 of FIG. 18 and then constrains searching to occur within unoccupied region 1810. Apartment topology module 330 performs a brute force search optimization to determine a specific position for an apartment complex 1910. In one embodiment, apartment topology module 330 may analyze each possible placement of apartment complex 1910 within search grid 1900 and select the placement that is farthest away from group 1720 of house units. During the search optimization, apartment topology module 330 generates different placements within search grid 1900 based on design heuristics 206. Design heuristics 206 could indicate, for example, rules for placing apartment complexes in a manner that is consistent with the organization of apartment complexes included in an existing urban layout.

FIG. 20 illustrates a neighborhood layout generated by the house topology module and apartment topology module of FIG. 2, according to various embodiments of the present invention. As shown, various houses 2000 and apartment complexes 2010 are distributed across different neighborhood subdivisions. House topology module 320 assigns house types to different groups of houses after generating house placements in the manner described above in conjunction with FIG. 17. Similarly, apartment topology module 330 assigns apartment complex types to different apartment complexes after generating apartment placements in the manner described above in conjunction with FIGS. 18-19. The topology of houses and apartments may resemble that associated with an existing urban layout because house topology module 320 and apartment topology module 330 operate based on design heuristics 206. In one embodiment, various construction rules included in design heuristics 206 are derived based on a topological analysis of an existing urban layout.

Figure 21:
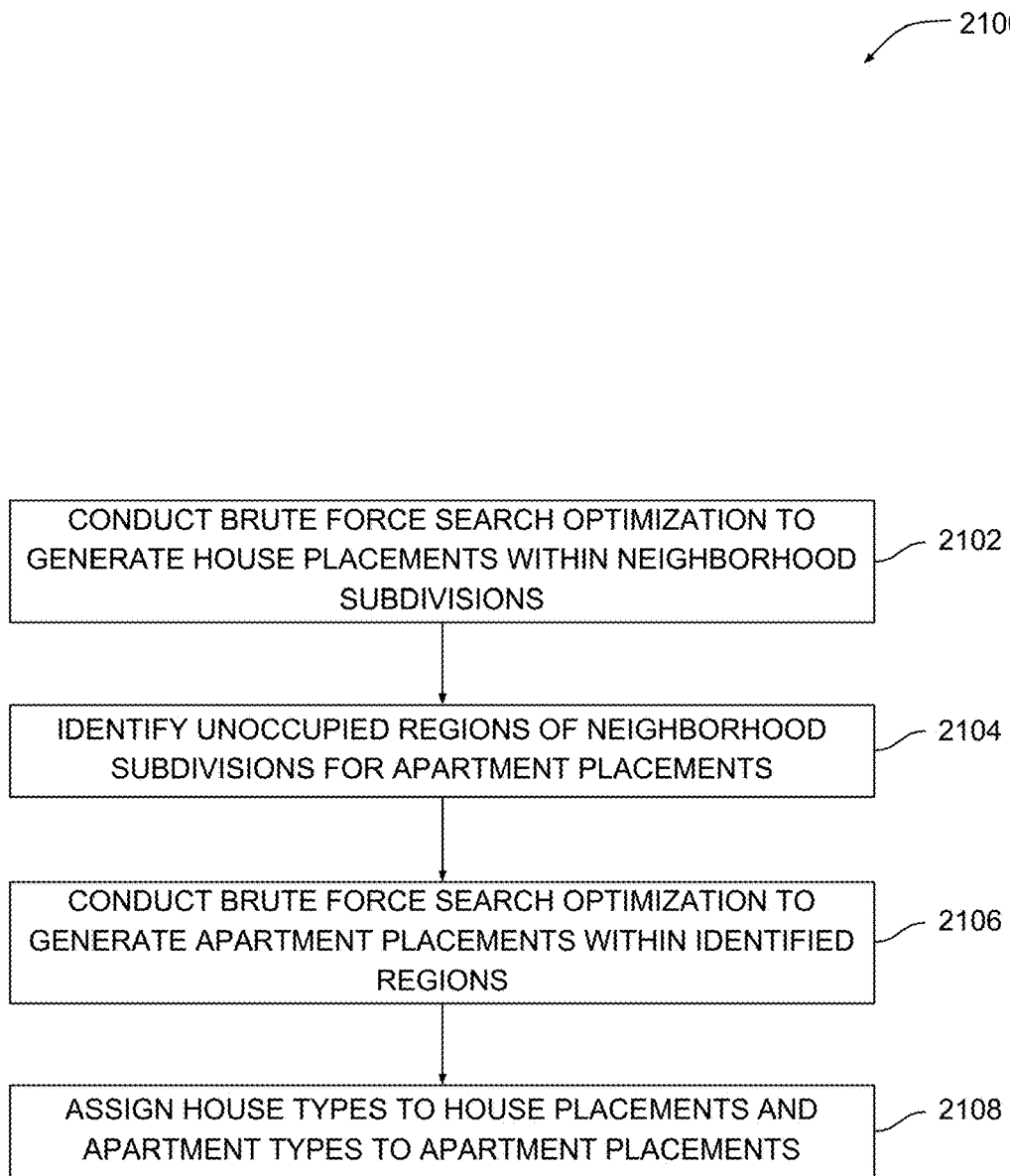
FIG. 21 is a flow diagram of method steps for populating neighborhood subdivisions with dwelling units for a design option, according to various embodiments of the present invention.

FIG. 21 is a flow diagram of method steps for populating neighborhood subdivisions with dwelling units for a design option, according to various embodiments of the present invention. Although the method steps are described in conjunction with the systems of FIGS. 1-20, persons skilled in the art will understand that any system configured to perform the method steps in any order falls within the scope of the present invention.

As shown, a method 2100 begins at step 2102, where house topology module 320 of FIG. 3 conducts a brute force search optimization to generate house placements within one or more neighborhood subdivisions. House topology module 320 generates a search grid to perform the brute force search optimization and then generates different placements within the search grid based on design heuristics 206. In one embodiment, design heuristics 206 may indicate rules for placing houses in a manner that is consistent with an arrangement of houses included in an existing urban layout. FIG. 17 illustrates an example of how house topology module 320 implements step 2102.

At step 2104, apartment topology module 330 of FIG. 3 identifies unoccupied regions of neighborhood subdivisions for apartment placements. In doing so, apartment topology module 330 projects a search grid outline over the neighborhood subdivision to determine areas that do not include house units and are available for placing apartment complexes. FIG. 18 illustrates an example of how apartment topology module 330 implements step 2104.

At step 2106, apartment topology module 330 conducts a brute force search optimization to generate apartment placements within the unoccupied regions identified at step 2104. Apartment topology module 330 projects a search grid within the search grid outline implemented when performing step 2104. Apartment topology module 330 then constrains a brute force search optimization to occur within unoccupied regions of the neighborhood subdivision based on design heuristics 206. In one embodiment, design heuristics 206 may indicate rules for placing apartment complexes in a manner that is consistent with an arrangement of apartment complexes included in an existing urban layout. FIG. 19 illustrates an example of how apartment topology module 330 implements step 2106.

At step 2108, house topology module 320 and apartment topology module 330 assign house types to house placements and apartment types to apartment placements, respectively. House topology module 320 and apartment topology module 330 perform these assignments based on design heuristics in order to generate a distribution of houses and apartments that is derivative of an existing urban layout.

Via the method 2100, house topology module 320 and apartment topology module 330 populate neighborhood subdivisions with houses and apartments. Vegetation module 340 then populates some or all remaining areas with parkland, landscaping, and/or other forms of vegetation. In one embodiment, vegetation module 240 performs these operations based on design heuristics 206 to maintains consistency with an existing urban layout.

Once geometry engine 200 generates candidate designs 208 via the different modules discussed above, evaluation engine 210 evaluates these candidate designs and generates design metrics 212. Geometry engine 200 and evaluation engine 210 iterate in the manner described in order to generate design options 140. Design options 140 may be derived from, and therefore have certain characteristics in common with, an existing urban layout.

Examples of Design Options Derived from Existing Urban Layouts

Figure 22:
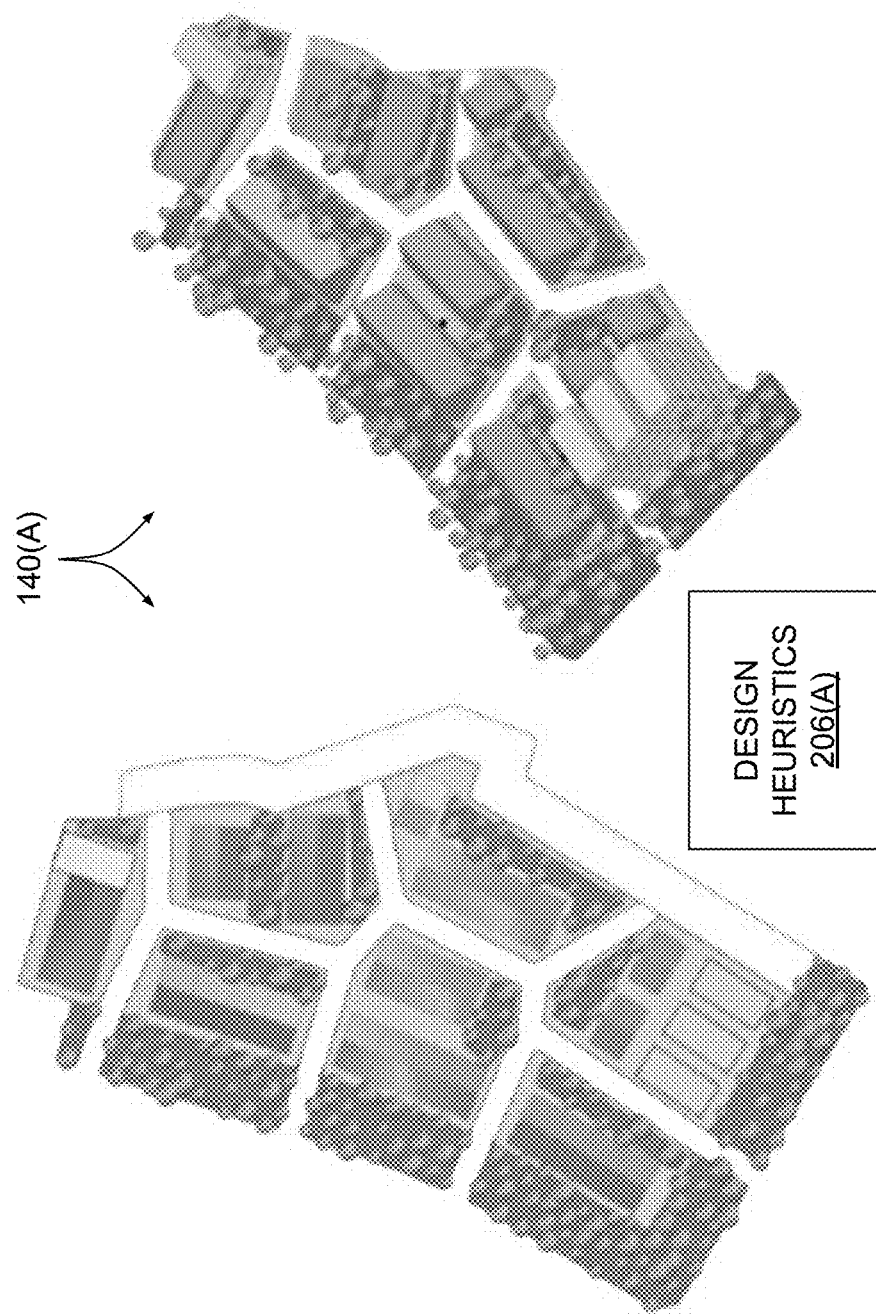
FIG. 22 illustrates a design option that is derived from the topology of a pre-existing urban layout, according to various embodiments of the present invention.

FIG. 22 illustrates a design option that is derived from the topology of a pre-existing urban layout, according to various embodiments of the present invention. As shown, design option 140(A) is characterized by 3-way intersections and consistently-sized neighborhood subdivisions, among other things. Design heuristics 206(A) includes construction rules derived from an existing urban layout having similar characteristics.

Figure 23:
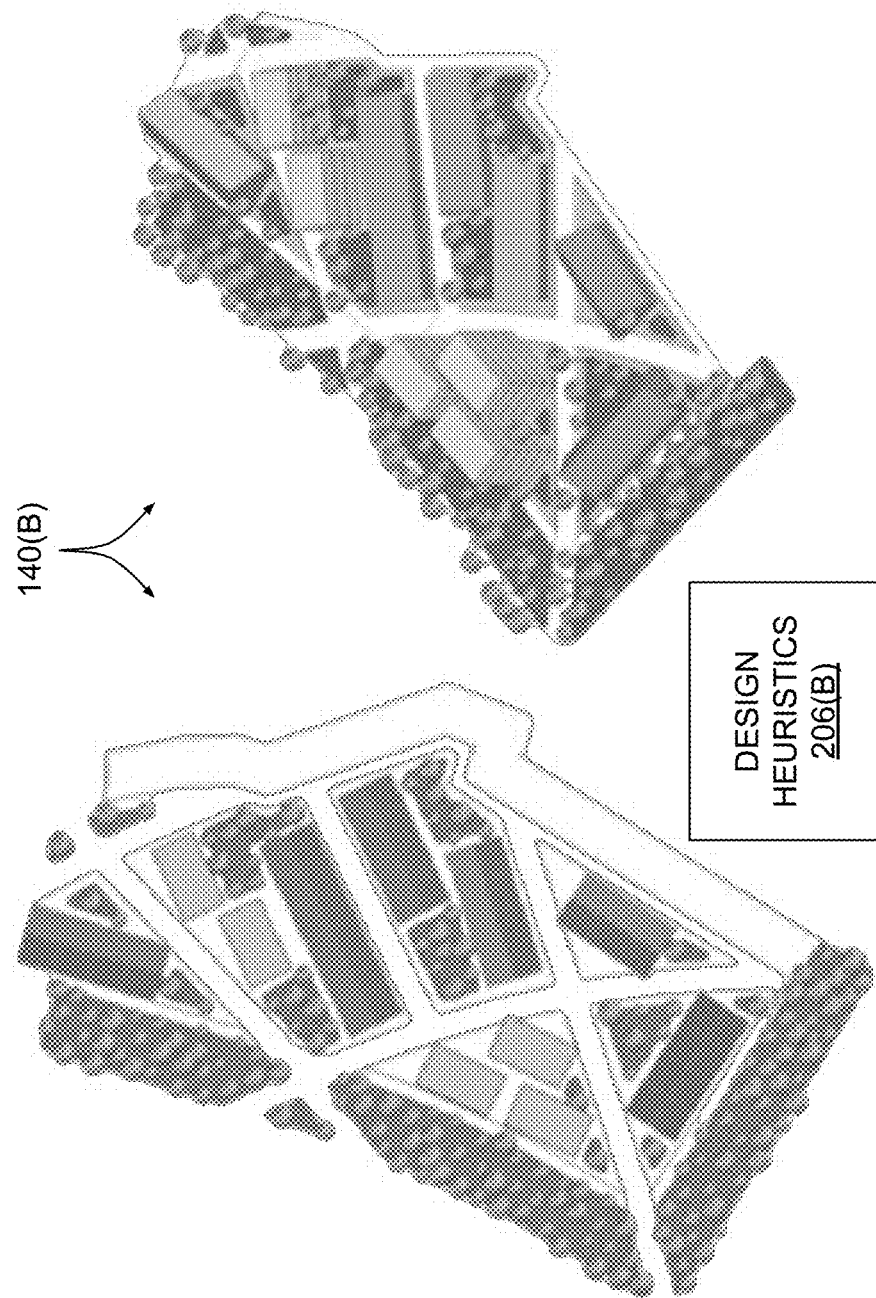
FIG. 23 illustrates a design option that is derived from the topology of another pre-existing urban layout, according to various other embodiments of the present invention.

FIG. 23 illustrates a design option that is derived from the topology of another pre-existing urban layout, according to various other embodiments of the present invention. As shown, design option 140(B) is characterized by avenues forming concentric arcs and radially-oriented streets intersecting those arcs, thereby forming rhombus-shaped neighborhood subdivisions. Design heuristics 206(B) includes construction rules derived from an existing urban layout having similar characteristics.

Figure 24:
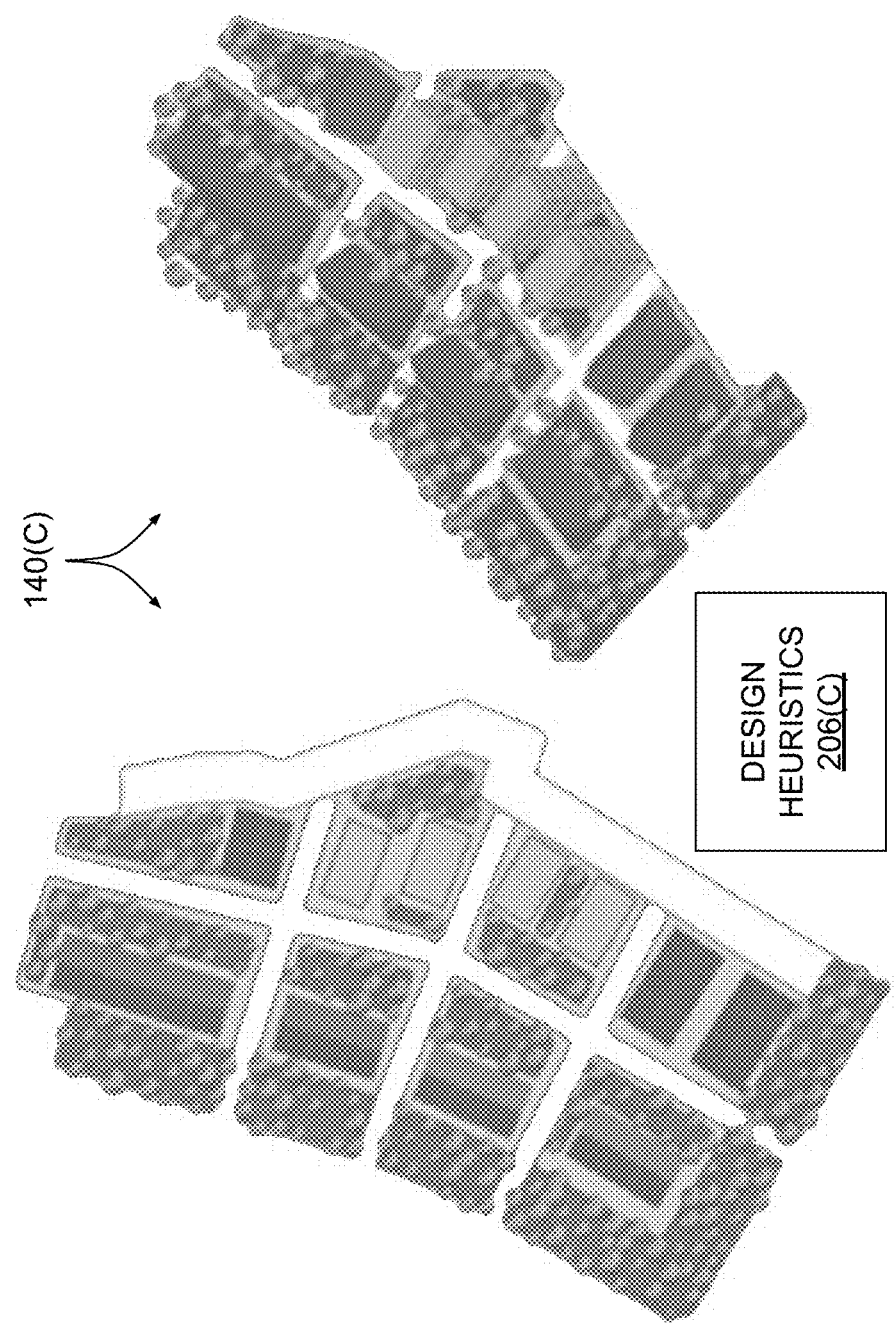
FIG. 24 illustrates a design option that is derived from the topology of yet another pre-existing urban layout, according to various other embodiments of the present invention.

FIG. 24 illustrates a design option that is derived from the topology of yet another pre-existing urban layout, according to various other embodiments of the present invention. As shown, design option 140(C) is characterized by a grid of roads that forms quadrangular neighborhood subdivisions. Design heuristics 206(C) includes construction rules derived from an existing urban layout having similar characteristics.

Referring generally to FIGS. 22-25, in one embodiment, geometry engine 200 may analyze the topology of existing urban layouts in order to derive design heuristics 206(A), 206(B), and 206(C). In doing so, geometry engine 200 may analyze the road topology, neighborhood topology, and dwelling unit topologies associated with each existing urban layout and to determine characteristic features of those layouts. Geometry engine 200 may then determine construction rules for incorporating those characteristics features into various designs to generate design heuristics 206(A), 206(B), and 206(C).

In sum, an urban design pipeline automatically generates design options for an urban design project. The urban design pipeline includes a geometry engine and an evaluation engine. The geometry engine analyzes design criteria, design objectives, and design heuristics associated with the urban design project and then generates numerous candidate designs. The design criteria specify a property boundary associated with a region of land to be developed, among other things. The design objectives indicate specific objective functions that should be optimized as well as various attributes that designs should have, including a specific type of topology that is derived from an existing urban layout. The design heuristics include different sets of construction rules for generating designs with different types of topologies. The geometry engine generates candidate designs that conform to the property boundary and have topological characteristics in common with the existing urban layout. Each candidate design includes a different layout of roads, house units, apartment units, and parkland suitable for populating the region of land with occupants.

At least one technological advantage of the disclosed urban design pipeline is that design options are automatically generated that both respect a current property boundary and also include characteristic features derived from the topology of an existing urban layout. Accordingly, designers can generate design options based on complex property boundaries with features that are similar to existing urban layouts. Another technological advantage is that the disclosed urban design pipeline includes repeatable components that can be easily adapted to other urban design projects with different property boundaries that need to be inspired by different existing urban layouts. Thus, the process of generating designs can be greatly expedited compared to conventional, manual techniques. These technological advantages represent multiple technological advancements relative to prior art approaches.

1. Some embodiments include a computer-implemented method for generating designs for an urban design project via a computer-aided design (CAD) application, the method comprising generating, via a geometry engine included in the CAD application, a design mesh for a plurality of candidate designs based on a first design criterion associated with a region of land, populating, via the geometry engine, the design mesh with a first set of structures based on a first set of construction rules and a first set of construction parameters to generate a first candidate design, wherein the first set of structures is organized within the first candidate design according to a first topology that is derived from a pre-existing topology associated with a pre-existing urban layout, generating, via an evaluation engine included in the CAD application, a first topological metric for the first candidate design based on the first topology, wherein the first topological metric indicates a first number of characteristic features included in the first candidate design that are also included in the pre-existing urban layout, populating, via the geometry engine, the design mesh with a second set of structures based on the first set of construction rules and a second set of construction parameters to generate a second candidate design, wherein the second set of structures is organized within the second candidate design according to a second topology that is derived from the pre-existing topology, generating, via the evaluation engine, a second topological metric for the second candidate design based on the second topology, wherein the second topological metric indicates a second number of characteristic features included in the second candidate design that are also included in the pre-existing urban layout, and determining, via the evaluation engine, that the second topological metric exceeds the first topological metric, thereby indicating that the second candidate design is a higher ranked design than the first candidate design.
2. The computer-implemented method of clause 1, wherein the first design criterion indicates a property boundary corresponding to the region of land, and wherein generating the design mesh comprises constructing a grid of polygons that is at least partially aligned to at least a portion of the property boundary.
3. The computer-implemented method of any of clauses 1-2, wherein the geometry engine evaluates the first set of construction rules based on different sets of construction parameters to generate different candidate designs.
4. The computer-implemented method of any of clauses 1-3, wherein the first set of structures includes a first network of roads that is organized according to the first topology, and wherein populating the design mesh with the first set of structures comprises generating a first road corresponding to a first portion of the design mesh based on a first construction rule included in the first set of construction rules and a first construction parameter included in the first set of construction parameters, and generating a second road corresponding to a second portion of the design mesh based on the first construction rule and a second construction parameter included in the first set of construction parameters.
5. The computer-implemented method of any of clauses 1-4, wherein generating the first road comprises evaluating the first construction rule based on the first construction parameter to determine at least one of a length, a width, a placement, an orientation, and a road type for the first road.
6. The computer-implemented method of any of clauses 1-5, wherein the first road and the second road form an intersection having a first intersection type, and wherein the first number of characteristic features included in the first candidate design is determined based on a number of intersections within the first candidate design that have the first intersection type.
7. The computer-implemented method of any of clauses 1-6, wherein the first set of structures includes a first plurality of neighborhood subdivisions that are organized according to the first topology, and wherein populating the design mesh with the first set of structures comprises dividing the design mesh into a first region and a second region based on a first construction rule included in the first set of construction rules and a first construction parameter included in the first set of construction parameters, and modifying at least one of the first region and the second region based on a second construction rule included in the first set of construction rules and a second construction parameter included in the first set of construction parameters to generate a first neighborhood subdivision included in the first plurality of neighborhood subdivisions.
8. The computer-implemented method of any of clauses 1-7, wherein modifying at least one of the first region and the second region comprises determining that at least one of the first region and the second region has an area that is less than a minimum area, and merging the first region with the second region to generate the first neighborhood subdivision.
9. The computer-implemented method of any of clauses 1-8, wherein modifying at least one of the first region and the second region comprises determining that the first region has a first aspect ratio that is outside of a target range of aspect ratios, and adjusting the first region to generate the first neighborhood subdivision, wherein the first neighborhood subdivision has a second aspect ratio that is within the target range of aspect ratios.
10. The computer-implemented method of any of clauses 1-9, wherein the first set of structures includes a first plurality of dwelling units that are organized according to the first topology, and wherein populating the design mesh with the first set of structures comprises projecting a search grid over a first neighborhood subdivision included in the design mesh, generating a first placement for the first plurality of dwelling units within the search grid based on a first construction rule included in the first set of construction rules and a first construction parameter included in the first set of construction parameters, and assigning a dwelling unit type to each dwelling unit included in the first plurality of dwelling units.

11. Some embodiments include a non-transitory computer-readable medium storing program instructions that, when executed by one or more processors, cause the one or more processors to generate designs for an urban design project via a computer-aided design (CAD) application by performing the steps of generating, via a geometry engine included in the CAD application, a design mesh for a plurality of candidate designs based on a first design criterion associated with a region of land, populating, via the geometry engine, the design mesh with a first set of structures based on a first set of construction rules and a first set of construction parameters to generate a first candidate design, wherein the first set of structures is organized within the first candidate design according to a first topology that is derived from a pre-existing topology associated with a pre-existing urban layout, generating, via an evaluation engine included in the CAD application, a first topological metric for the first candidate design based on the first topology, wherein the first topological metric indicates a first number of characteristic features included in the first candidate design that are also included in the pre-existing urban layout, populating, via the geometry engine, the design mesh with a second set of structures based on the first set of construction rules and a second set of construction parameters to generate a second candidate design, wherein the second set of structures is organized within the second candidate design according to a second topology that is derived from the pre-existing topology, generating, via the evaluation engine, a second topological metric for the second candidate design based on the second topology, wherein the second topological metric indicates a second number of characteristic features included in the second candidate design that are also included in the pre-existing urban layout, and determining, via the evaluation engine, that the second topological metric exceeds the first topological metric, thereby indicating that the second candidate design is a higher ranked design than the first candidate design.

12. The non-transitory computer-readable medium of clause 11, wherein the first design criterion indicates a property boundary corresponding to the region of land, and wherein the step of generating the design mesh comprises constructing a grid of polygons that is at least partially aligned to at least a portion of the property boundary.

13. The non-transitory computer-readable medium of any of clauses 11-12, wherein the geometry engine evaluates the first set of construction rules based on different sets of construction parameters to generate different candidate designs.

14. The non-transitory computer-readable medium of any of clauses 11-13, wherein the first set of structures includes a first network of roads that is organized according to the first topology, and wherein the step of populating the design mesh with the first set of structures comprises generating a first road corresponding to a first portion of the design mesh based on a first construction rule included in the first set of construction rules and a first construction parameter included in the first set of construction parameters, and generating a second road corresponding to a second portion of the design mesh based on the first construction rule and a second construction parameter included in the first set of construction parameters.

15. The non-transitory computer-readable medium of any of clauses 11-14, wherein generating the first road comprises evaluating the first construction rule based on the first construction parameter to determine at least one of a length, a width, a placement, an orientation, and a road type for the first road.

16. The non-transitory computer-readable medium of any of clauses 11-15, wherein the first road and the second road form an intersection having a first intersection type, and wherein the first number of characteristic features included in the first candidate design is determined based on a number of intersections within the first candidate design that have the first intersection type.

17. The non-transitory computer-readable medium of any of clauses 11-16, wherein the first set of structures includes a first plurality of neighborhood subdivisions that are organized according to the first topology, and wherein the step of populating the design mesh with the first set of structures comprises dividing the design mesh into a first region and a second region based on a first construction rule included in the first set of construction rules and a first construction parameter included in the first set of construction parameters, and modifying at least one of the first region and the second region based on a second construction rule included in the first set of construction rules and a second construction parameter included in the first set of construction parameters to generate a first neighborhood subdivision included in the first plurality of neighborhood subdivisions.

18. The non-transitory computer-readable medium of any of clauses 11-17, wherein the first set of structures includes a first plurality of dwelling units that are organized according to the first topology, and wherein the step of populating the design mesh with the first set of structures comprises projecting a search grid over a first neighborhood subdivision included in the design mesh, generating a first placement for the first plurality of dwelling units within the search grid based on a first construction rule included in the first set of construction rules and a first construction parameter included in the first set of construction parameters, and assigning a dwelling unit type to each dwelling unit included in the first plurality of dwelling units.

19. The non-transitory computer-readable medium of any of clauses 11-18, further comprising the step of generating, via the geometry engine, the first set of construction rules based on a topological analysis of the pre-existing topology, wherein the first topology comprises at least one of a topology of roads, a topology of neighborhoods, and a topology of dwelling units included in the first candidate design.

20. Some embodiments include a system, comprising a memory storing a computer-aided design (CAD) application, and a processor that, when executing the CAD application, is configured to perform the steps of generating, via a geometry engine included in the CAD application, a design mesh for a plurality of candidate designs based on a first design criterion associated with a region of land, populating, via the geometry engine, the design mesh with a first set of structures based on a first set of construction rules and a first set of construction parameters to generate a first candidate design, wherein the first set of structures is organized within the first candidate design according to a first topology that is derived from a pre-existing topology associated with a pre-existing urban layout, generating, via an evaluation engine included in the CAD application, a first topological metric for the first candidate design based on the first topology, wherein the first topological metric indicates a first number of characteristic features included in the first candidate design that are also included in the pre-existing urban layout, populating, via the geometry engine, the design mesh with a second set of structures based on the first set of construction rules and a second set of construction parameters to generate a second candidate design, wherein the second set of structures is organized within the second candidate design according to a second topology that is derived from the pre-existing topology, generating, via the evaluation engine, a second topological metric for the second candidate design based on the second topology, wherein the second topological metric indicates a second number of characteristic features included in the second candidate design that are also included in the pre-existing urban layout, and determining, via the evaluation engine, that the second topological metric exceeds the first topological metric, thereby indicating that the second candidate design is a higher ranked design than the first candidate design.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for generating designs for an urban design project via a computer-aided design (CAD) application, the method comprising:
   populating, via a geometry engine included in the CAD application, a design mesh with a first set of structures based on a first set of construction rules and a first set of construction parameters to generate a first candidate design;
   generating, via an evaluation engine included in the CAD application, a first topological metric for the first candidate design based on a first topology;
   populating, via the geometry engine, the design mesh with a second set of structures based on the first set of construction rules and a second set of construction parameters to generate a second candidate design;
   generating, via the evaluation engine, a second topological metric for the second candidate design based on a second topology; and
   determining, via the evaluation engine, that the second topological metric exceeds the first topological metric, thereby indicating that the second candidate design is a higher ranked design than the first candidate design.

2. The computer-implemented method of claim 1, wherein the first set of structures is organized within the first candidate design according to the first topology that is derived from a pre-existing topology associated with a pre-existing urban layout.

3. The computer-implemented method of claim 2, wherein the first topological metric indicates a first number of characteristic features included in the first candidate design that are also included in the pre-existing urban layout.

4. The computer-implemented method of claim 1, wherein the second set of structures is organized within the second candidate design according to the second topology that is derived from a pre-existing topology associated with a pre-existing urban layout.

5. The computer-implemented method of claim 1, wherein the second topological metric indicates a second number of characteristic features included in the second candidate design that are also included in a pre-existing urban layout.

6. The computer-implemented method of claim 1, further comprising generating, via the geometry engine, the design mesh for a plurality of candidate designs based on a first design criterion associated with a region of land.

7. The computer-implemented method of claim 6, wherein the first design criterion indicates a property boundary corresponding to the region of land, and wherein generating the design mesh comprises constructing a grid of polygons that is at least partially aligned to at least a portion of the property boundary.

8. The computer-implemented method of claim 1, wherein the first set of structures includes a first network of roads that is organized according to the first topology, and wherein populating the design mesh with the first set of structures comprises:
  generating a first road corresponding to a first portion of the design mesh based on a first construction rule included in the first set of construction rules and a first construction parameter included in the first set of construction parameters; and
  generating a second road corresponding to a second portion of the design mesh based on the first construction rule and a second construction parameter included in the first set of construction parameters.

9. The computer-implemented method of claim 1, wherein the first set of structures includes a first plurality of neighborhood subdivisions that are organized according to the first topology, and wherein populating the design mesh with the first set of structures comprises:
  dividing the design mesh into a first region and a second region based on a first construction rule included in the first set of construction rules and a first construction parameter included in the first set of construction parameters; and
  modifying at least one of the first region and the second region based on a second construction rule included in the first set of construction rules and a second construction parameter included in the first set of construction parameters to generate a first neighborhood subdivision included in the first plurality of neighborhood subdivisions.

10. The computer-implemented method of claim 1, wherein the first set of structures includes a first plurality of dwelling units that are organized according to the first topology, and wherein populating the design mesh with the first set of structures comprises:
  projecting a search grid over a first neighborhood subdivision included in the design mesh;
  generating a first placement for the first plurality of dwelling units within the search grid based on a first construction rule included in the first set of construction rules and a first construction parameter included in the first set of construction parameters; and
  assigning a dwelling unit type to each dwelling unit included in the first plurality of dwelling units.

11. One or more non-transitory computer-readable media storing instructions that, when executed by one or more processors, cause the one or more processors to generate designs for an urban design project via a computer-aided design (CAD) application by performing the steps of:
  populating a design mesh with a first set of structures to generate a first candidate design;
  generating a first topological metric for the first candidate design based on a first topology;
  populating the design mesh with a second set of structures to generate a second candidate design;
  generating a second topological metric for the second candidate design based on a second topology; and
  determining that the second topological metric exceeds the first topological metric, thereby indicating that the second candidate design is a higher ranked design than the first candidate design.

12. The one or more non-transitory computer-readable media of claim 11, wherein the first set of structures is organized within the first candidate design according to the first topology that is derived from a pre-existing topology associated with a pre-existing urban layout.

13. The one or more non-transitory computer-readable media of claim 12, wherein the first topological metric indicates a first number of characteristic features included in the first candidate design that are also included in the pre-existing urban layout.

14. The one or more non-transitory computer-readable media of claim 11, wherein the second set of structures is organized within the second candidate design according to the second topology that is derived from a pre-existing topology associated with a pre-existing urban layout.

15. The one or more non-transitory computer-readable media of claim 11, wherein the second topological metric indicates a second number of characteristic features included in the second candidate design that are also included in a pre-existing urban layout.

16. The one or more non-transitory computer-readable media of claim 11, further comprising generating the design mesh for a plurality of candidate designs based on a first design criterion associated with a region of land.

17. The one or more non-transitory computer-readable media of claim 16, wherein the first design criterion indicates a property boundary corresponding to the region of land, and wherein generating the design mesh comprises constructing a grid of polygons that is at least partially aligned to at least a portion of the property boundary.

18. The one or more non-transitory computer-readable media of claim 11, wherein the first set of structures includes a first network of roads that is organized according to the first topology, and wherein populating the design mesh with the first set of structures comprises:
  generating a first road corresponding to a first portion of the design mesh based on a first construction rule included in a first set of construction rules and a first construction parameter included in a first set of construction parameters; and
  generating a second road corresponding to a second portion of the design mesh based on the first construction rule and a second construction parameter included in the first set of construction parameters.

19. The one or more non-transitory computer-readable media of claim 11, wherein the first set of structures includes a first plurality of neighborhood subdivisions that are organized according to the first topology, and wherein populating the design mesh with the first set of structures comprises:
   dividing the design mesh into a first region and a second region based on a first construction rule included in a first set of construction rules and a first construction parameter included in a first set of construction parameters; and
   modifying at least one of the first region and the second region based on a second construction rule included in the first set of construction rules and a second construction parameter included in the first set of construction parameters to generate a first neighborhood subdivision included in the first plurality of neighborhood subdivisions.

20. The one or more non-transitory computer-readable media of claim 11, wherein the first set of structures includes a first plurality of dwelling units that are organized according to the first topology, and wherein populating the design mesh with the first set of structures comprises:
   projecting a search grid over a first neighborhood subdivision included in the design mesh;
   generating a first placement for the first plurality of dwelling units within the search grid based on a first construction rule included in a first set of construction rules and a first construction parameter included in a first set of construction parameters; and
   assigning a dwelling unit type to each dwelling unit included in the first plurality of dwelling units.

21. A system, comprising:
one or more memories storing instructions; and
one or more processors that are coupled to the one or more memories and, when executing the instructions, are configured to perform the steps of:
   populating a design mesh with a first set of structures to generate a first candidate design;
   generating a first topological metric for the first candidate design;
   populating the design mesh with a second set of structures to generate a second candidate design;
   generating a second topological metric for the second candidate design; and
   determining that the second topological metric exceeds the first topological metric, thereby indicating that the second candidate design is a higher ranked design than the first candidate design.

22. The system of claim 21, wherein the one or more processor are implemented on one or more server machines.

* * * * *